US011746015B2

(12) United States Patent
Michaud-Bernlochner et al.

(10) Patent No.: US 11,746,015 B2
(45) Date of Patent: Sep. 5, 2023

(54) PROCESS FOR THE PREPARATION OF A POROUS CARBON MATERIAL USING AN IMPROVED AMPHIPHILIC SPECIES

(71) Applicant: Heraeus Battery Technology GmbH, Hanau (DE)

(72) Inventors: Julie Michaud-Bernlochner, Bonn (DE); Daniel Weingarth, Rodgau (DE); Andreas Kuhn, Goldbach (DE); Dominik Samuelis, Bruchköbel (DE)

(73) Assignee: HERAEUS BATTERY TECHNOLOGY GMBH, Hanau (DE)

(*) Notice: Subject to any disclaimer, the term of this patent is extended or adjusted under 35 U.S.C. 154(b) by 288 days.

(21) Appl. No.: 16/757,967

(22) PCT Filed: Oct. 26, 2018

(86) PCT No.: PCT/EP2018/079453
§ 371 (c)(1),
(2) Date: Apr. 21, 2020

(87) PCT Pub. No.: WO2019/081732
PCT Pub. Date: May 2, 2019

(65) Prior Publication Data
US 2020/0339420 A1 Oct. 29, 2020

(30) Foreign Application Priority Data
Oct. 27, 2017 (EP) ..................... 17001778

(51) Int. Cl.
*C01B 32/05* (2017.01)
(52) U.S. Cl.
CPC .......... *C01B 32/05* (2017.08); *C01P 2004/61* (2013.01); *C01P 2004/64* (2013.01); *C01P 2006/10* (2013.01); *C01P 2006/12* (2013.01); *C01P 2006/14* (2013.01); *C01P 2006/17* (2013.01); *C01P 2006/40* (2013.01)

(58) Field of Classification Search
CPC ..................................................... C01B 32/05
See application file for complete search history.

(56) References Cited

U.S. PATENT DOCUMENTS

| | | | |
|---|---|---|---|
| 6,297,293 B1 | 10/2001 | Bell et al. | |
| 6,514,454 B1 | 2/2003 | Ganguli et al. | |
| 7,655,209 B2 | 2/2010 | Rumpf et al. | |
| 9,718,690 B2 | 8/2017 | Neumann et al. | |
| 10,287,412 B2 * | 5/2019 | Karthik | C01B 32/00 |
| 11,335,904 B2 * | 5/2022 | Troegel | H01M 4/134 |
| 2005/0214539 A1 | 9/2005 | Ying et al. | |
| 2007/0253887 A1 | 7/2007 | Foley et al. | |
| 2009/0258213 A1 | 10/2009 | Chmelka et al. | |
| 2010/0297389 A1 | 11/2010 | Dai et al. | |
| 2011/0177392 A1 | 7/2011 | Hoshiba | |
| 2012/0234695 A1 | 9/2012 | Mayes et al. | |
| 2012/0301387 A1 | 11/2012 | Neumann | |
| 2014/0328006 A1 | 11/2014 | Mitlin et al. | |
| 2015/0064256 A1 | 3/2015 | Howell et al. | |
| 2015/0274921 A1 | 10/2015 | Celzard et al. | |
| 2016/0039970 A1 | 2/2016 | Kron et al. | |
| 2016/0280553 A1 | 9/2016 | Sharif et al. | |
| 2017/0029574 A1 | 2/2017 | Bureau et al. | |
| 2017/0110719 A1 | 4/2017 | Wang et al. | |

FOREIGN PATENT DOCUMENTS

| | | |
|---|---|---|
| CN | 103879986 A | 6/2014 |
| CN | 105531241 | 4/2016 |
| CN | 105826540 A | 8/2016 |
| EP | 2407423 | 1/2012 |
| EP | 2921468 | 9/2015 |
| JP | 2004506753 | 3/2004 |
| JP | 2012527397 | 11/2012 |
| JP | 2014-522355 A | 9/2014 |
| JP | 2015057373 A | 3/2015 |
| JP | 2015-516373 A | 6/2015 |
| JP | 2016-28008 A | 2/2016 |
| JP | 2016032802 | 3/2016 |
| JP | 2016519695 | 7/2016 |
| JP | 2016531818 | 10/2016 |
| JP | 2017-519053 A | 7/2017 |

(Continued)

OTHER PUBLICATIONS

Japanese Office Action dated Jun. 1, 2021 for Japanese Patent Application No. 2020-521330.
Chinese Office Action dated Oct. 22, 2021 for Chinese Patent Application No. 201880068825.3.
Korean Office Action dated Dec. 17, 2021 for Korean Patent Application No. 2020-7014620.
Jiao et al., "Influence of template on the structure of mesoporous carbon prepared with novalac resin as carbon precursor", J Porous Mater, 2013, 20, pp. 1247-1255.
Huang et al., "A curing agent method to synthesize ordered mesoporous carbons from linear novolac phenolic resin polymers", J Mater Chem, 2009, 19, pp. 6536-6541.
Qian et al., "Structure Design Of Mesoporous Carbons By Blending PEO-PPO-PEO-Type And PPO-PEO-PPO-Type Amphiphilic Block Copolymers In Organic-Organic Self-Assembly", Microporous and Mesoporous Materials 141, pp. 26-37 (2011).

(Continued)

*Primary Examiner* — Stuart L Hendrickson
(74) *Attorney, Agent, or Firm* — Panitch Schwarze Belisario & Nadel LLP

(57) ABSTRACT

A process for the preparation of a porous carbon material using an improved amphiphilic species. Also disclosed are a porous carbon material, devices comprising the porous carbon material and use of an amphiphilic compound for the preparation of a porous carbon material. The process for preparing a porous carbon material comprises the process steps: (a) providing a carbon source comprising a first carbon source compound; (b) providing an amphiphilic species comprising a first amphiphilic compound, the first amphiphilic compound comprising two or more adjacent ethylene oxide-based repeating units; (c) contacting the carbon source and the amphiphilic species to obtain a precursor; and (d) heating the precursor to obtain the porous carbon material.

13 Claims, 10 Drawing Sheets

(56) References Cited

FOREIGN PATENT DOCUMENTS

| | | | |
|---|---|---|---|
| JP | 2017-135187 A | | 8/2017 |
| JP | 6997832 B2 | | 1/2022 |
| KR | 20140092231 A | | 7/2014 |
| KR | 20170019424 A | | 2/2017 |
| WO | 2002012380 | | 2/2002 |
| WO | 2012029918 | | 3/2012 |
| WO | 2012131628 A1 | | 10/2012 |
| WO | 2013188050 | | 12/2013 |
| WO | 2015040186 | | 3/2015 |

OTHER PUBLICATIONS

Office Action dated Apr. 20, 2022 for counterpart Chinese Patent Application No. 201880068825.3 (with partial English translation from Global Dossier attached).

Zhu et al., "Porous and high electronic conductivity nitrogen-doped nano-sheet carbon derived from polypyrrole for high-power supercapacitors", Carbon, 2016, 107, pp. 638-645.

Liu et al., "A low-temperature autoclaving route to synthesize monolithic carbon materials with an ordered mesostructure", Carbon, 2010, 48(7), pp. 2089-2099.

European Search Report dated Nov. 25, 2021 for European Application No. EP18792948.

Japanese Office Action dated Jun. 15, 2021 for Japanese Patent Application No. 2020-102064.

Zaki et al., "Propylene Oxide-Ethylene Oxide Block Copolymers as Demulsifiers for Water-in-Oil Emulsions, II [1]. Effects of Temperature, Sylinity, pH-Value, and Solvents on the Demulsification Efficiency", Monatshefte für Chemie,1996, 127, pp. 1239-1245.

Weidner et al., "A novel software tool for copolymer characterization by coupling of liquid chromatography with matrix-assisted laser desorption/ionization time-of-flight mass spectrometry", Rapid Commun Mas Spectrom, 2007, 21, pp. 2750-2758.

Guo et al., "Calculation of hydrophile-lipophile balance for polyethoxylated surfactants by group contribution method", Journal of Colloid and Interface Science, 2006, 298, pp. 441-450.

Steiner et al., "Expanding the understanding about interactions of certain additives inside the negative material of lead batteries for further increase of micro-cycling and DCA performance", Prasentation, Moll Batterien, Bad Staffelstein.

Settelein et al., "The external surface area of carbon additives as key to enhance the dynamic charge acceptance of lead-carbon electrodes", Journal of Energy Storage, 2018, 15, pp. 196-204.

International Search Report and Written Opinion for PCT Application PCT/EP2018/079453.

Gardziella et al., "Phenolic Resins", Chemistry Applications Standardization Safety and Ecology, Springer-Verlag, Berlin Heidelberg, 2000.

Lu et al., "The acid-catalysed phenol-formaldehyde reaction", Trans IChenE, Part B, 2004, 82(B1), pp. 37-47.

Kumpinsky, "pH Effects on Phenol-Formaldehyde Runaway Reactions", Ind Eng Chem Res, 1995, 34, pp. 3096-3101.

Steiner et al., "Expanding the understanding about interactions of certain additives inside the negative material of lead batteries for further increase of micro-cycling and DCA performance", Prasentation, Moll Batterien, Bad Staffelstein, 16th European Lead Battery Conference and Exhibition, Sep. 2018.

International Search Report and Written Opinion dated Jan. 18, 2019 for PCT Application PCT/EP2018/079453.

International Search Report and Written Opinion dated Jan. 23, 2019 for PCT Application PCT/EP2018/079457.

Office Action dated May 27, 2022 in U.S. Appl. No. 16/759,012, by Michaud-Bernlochner.

Opposition dated Jul. 19, 2022 in JP7002650.

Opposition dated Jul. 19, 2022 in JP68997832.

Encyclopedia of Nanoscience and Nanotechnology, vol. 1, pp. 1-879 (2004).

Burgess et al., "Particle Size Analysis: AAPS Workshop Report, Cosponsored by the Food and Drug Administration and the United States Pharmacopeia," The AAPS Journal, vol. 6 (3), pp. 1-12 (2004).

Colfen, "Analytical Ultracentrifugation of Nanoparticles," Encyclopedia of Nanoscience and Nanotechnology, vol. 1, pp. 67-88 (2004).

Colfen, "W. Machtle and L. Borger (Eds.) Analytical Ultracentrifugation of Polymers and Nanoparticles," Anal Bioanal Chem, vol. 385, pp. 795-796 (2006).

Electric Vehicle Database, downloaded from web page:https://ev-database.org/#sort:path~type~order=.rank~number~desc|range-slider-range:prev~next=0~1200|range-slider-acceleration:prev~next=2~23|range-slider-topspeed:prev~next=110~350|range-slider-battery:prev~next=10~200|range-slider-towweight:prev~next=0~2500|range-slider-fastcharge:prev~next=0~1500|paging:currentPage=0|paging:number=3, download date: Oct. 11, 2022. Original posting date: unknown, 3 pages.

Jäckel et al., "Increase in Capacitance by Subnanometer Pores in Carbon," ACS Energy Letters, vol. 1, pp. 1262-1265 (2016).

König et al., "An Overview of Parameter and Cost for Battery Electric Vehicles," World Electric Vehicle Journal, vol. 12, Issue 21, 29 pages (2021).

Lin et al., "Connecting the irreversible capacity loss in Li-ion batteries with the electronic insulating properties of solid electrolyte interphase (SEI) components," Journal of Power Sources, vol. 309, pp. 221-230 (2016).

Liu, "Application of Carbon Materials in Supercapacitors," National Defense Industry Press, p. 97 (2013).

Liu, "Synthesis and Application of Mesoporous Carbon Materials," National Defense Industry Press, pp. 13-14 (2012).

McCusker et al., "Nomenclature of Structural and Compositional Characteristics of Ordered Microporous and Mesoporous Materials with Inorganic Hosts," Pure Appl. Chem., vol. 73, No. 2, pp. 381-394 (2001).

Neimark et al., "Quenched solid density functional theory and pore size analysis of micro-mesoporous carbons," Carbon 47, pp. 1617-1628 (2009).

Office Action dated Aug. 29, 2022 in CN Application No. 201880068825.3 (with Partial English Translation).

Office Action dated Oct. 7, 2022 in U.S. Appl. No. 16/759,012, by Michaud-Bernlochner.

Particle Size Result Interpretation: Number vs. Volume Distributions, downloaded from web page: https://www.horiba.com/deu/scientific/products/particle-characterization/particle-education/particle-size-result-interpretation/, download date: Jan. 14, 2023. Original posting date: unknown, 5 pages.

Standard Test Method for Precipitated Silica-Surface Area by Multipoint BET Nitrogen Adsorption, downloaded from web page: https://www.astm.org/d1993-91 r97.html, download date: Jan. 14, 2023, Original posting date unknown, 1 page.

Wang et al., "Review on modeling of the anode solid electrolyte interphase (SEI) for lithium-ion batteries," NPJ Computational Materials, vol. 4, Article No. 15 (2018).

Wikipedia entry for "Average," downloaded from web page: The Wayback Machine—https://web.archive.org/web/20161218181756/https://en.wikipedia.org/wiki/ Average, Jan. 14, 2023, Original posting date: unknown, 7 pages.

Wikipedia entry for "Carbon," downloaded from web page: The Wayback Machine—https://web.archive.org/web/20161119005053/https://ja.wikipedia.org, download date: Jan. 14, 2023, Original posting date: unknown, 3 pages.

Wikipedia entry for "Lithium-ion battery", downloaded from web page: https://web.archive.org/web/20170722143959/https://en.wikipedia.org/wiki/Lithium-ion_battery, download date: Oct. 10, 2022. Original posting date: unknown, 33 sages.

Wikipedia entry for "Lithium-ion secondary battery," downloaded from web page: The Wayback Machine—https://web.archive.org/web/20161124192058/https://en.wikipedia.org/wiki/Lithium,•download date: Jan. 14, 2023, Original posting date: unknown, 4 pages.

(56) References Cited

OTHER PUBLICATIONS

Wikipedia entry for "Mode (statistics)", downloaded from web page: https://web.archive.org/web/20161011192252/https://en.wikipedia.org/wiki/Mode, download date: Feb. 16, 2022. Original posting date: unknown, 8 pages.
Wang et al., "Interconnected Carbon Nanosheets Derived from Hemp for Ultrafast Supercapacitors with High Energy," ACS Nano, vol. 7, Issue 6, pp. 5131-5141 (2013).
Yu et.al., "Fabrication of Ordered Uniform Porous Carbon Networks and Their Application to a Catalyst Supporter," J. AM. Chem. Soc., vol. 124, pp. 9382-9383 (2002).
Office Action dated May 30, 2023 in Korean Application No. 10-2023-7008406.

* cited by examiner

PROCESS FOR THE PREPARATION OF A POROUS CARBON MATERIAL USING AN IMPROVED AMPHIPHILIC SPECIES

CROSS REFERENCE TO RELATED APPLICATIONS

This application is a U.S. National Phase filing of International Patent Application No. PCT/EP2018/079453 filed on Oct. 26, 2018, which claims the priority of European Patent Application No. 17001778.4 filed on Oct. 27, 2017. The disclosures of these applications are hereby incorporated by reference in their entirety.

TECHNICAL FIELD

The present invention relates to a process for the preparation of a porous carbon material using an improved amphiphilic species. The invention further relates to a porous carbon material, devices comprising the porous carbon material and use of an amphiphilic compound for the preparation of a porous carbon material.

BACKGROUND

There exists a demand for porous carbon materials, especially for use in applications where both electrical conductivity and material permeability are required in the same substance. Such applications are for instance ion transfer cells, in which an electrode material interacts with charge carriers at a solid-liquid boundary.

A porous carbon material which is known in the prior art is carbon black. Carbon black is produced by incomplete combustion of heavy petroleum products such as fluid catalytic cracking (FCC) tar, coal tar, ethylene cracking tar, and a small amount from vegetable oil. Such a process for the production of carbon black is for example disclosed in U.S. Pat. No. 7,655,209. The applications of porous carbon are generally based on the properties of the pore structure. Known applications are electrodes, such as in lithium ion cells in which simultaneous transport of ions and electrons through the electrode material is required; catalysts, in which a high active surface area and pore accessibility are required; and fuel cells, in which transport of fuel and electrical conductivity, are required.

Processes for producing a porous carbon material using a template acting as a negative to shape the carbon are known in the prior art. Therein, the carbon material is characterized by a pore structure which is substantially predetermined by the structure of the template material. (By "predetermined" is meant determined beforehand, so that the predetermined characteristic must be determined, i.e., chosen or at least known, in advance of some event.) The template can for example be made from a silicon oxide. A process for producing a silicon oxide template known in the prior art is the so-called sol-gel process. The sol-gel route to preparation of silicon oxide is well known to the skilled person. For example, producing a monolithic silica body via the sol-gel process is described in U.S. Pat. No. 6,514,454.

One method for preparing a porous carbon material without using a solid template is described in U.S. Patent Application Publication No. 2005/214539. There, a prolonged polymerization step is required prior to firing.

There persists a need to provide improved methods for making porous carbon materials, in particular, by a polymerization-type process without employing a solid template and with a short polymerization step. There also exists a need for porous carbon materials with improved properties.

SUMMARY OF THE DISCLOSURE

Generally, it is an object of the present invention to at least, partly overcome a disadvantage arising from the prior art.

It is an object of the present invention to provide a process for preparing a porous carbon material, wherein the process has a reduced duration.

It is an object of the present invention to provide a process for preparing a porous carbon material, wherein the process involves less steps.

It is an object of the present invention to provide a process for preparing a porous carbon material, wherein the porous carbon material has improved properties.

It is an object of the present invention to provide a process for preparing a porous carbon material, wherein the porous carbon material has a modal pore size in the macro-pore range.

It is an object of the present invention to provide a process for preparing a porous carbon material, wherein the porous carbon material has a modal pore size above 50 nm.

It is a particular object of the present invention to provide a process for preparing a porous carbon material which does not require a cross-linking agent.

It is a particular object of the present invention to provide a process for preparing a porous carbon material which is environmentally friendly.

It is a particular object of the invention to provide a process for preparing a porous carbon material without the need for an extensive mixing step.

It is a particular object of the invention to provide a process for preparing a porous carbon material having improved ion transport.

It is an object of the invention to provide a process for the preparation of a porous carbon product with low impurity concentration.

It is an object of the invention to provide a Li-ion cell with high calendar lifetime.

It is an object of the invention to provide a Li-ion cell with high cycle lifetime.

It is an object of the invention to provide a Li-ion cell with a reduced defect rate.

A contribution to achieving at least one of the above objects is made by one or more of the thirty-four embodiments disclosed below.

|1| A process for preparing a porous carbon material comprising the process steps:

a. providing a carbon source comprising a fast carbon source compound;

b. providing an amphiphilic species comprising a first amphiphilic compound, the first amphiphilic compound comprising two or more adjacent ethylene oxide-based repeating units, preferably 5 or mare, more preferably 7 or more, more preferably 20 or more, or 30 or more, or 50 or more (he amphiphilic compound might comprise up to about 1,000 adjacent ethylene oxide-based repeating units);

c. contacting the carbon source and the amphiphilic species to obtain a precursor; and d. heating the precursor to obtain the porous carbon material.

In this context, a compound is preferably a molecule, an ionic compound or a molecular ionic compound.

|2| The process according to embodiment |1|, wherein the first amphiphilic compound comprises more than 10 wt. % of ethylene oxide-based repeating units, based on the total weight of the first amphiphilic compound, preferably more than 20 wt. %, more preferably more than 30 wt. %, most preferably more than 40 wt. %. In some cases, the compound may comprise up to 90 wt. % of ethylene oxide-based repeating units. In one aspect of this embodiment, the first amphiphilic compound comprises from 10 to 90 wt. % of ethylene oxide-based repeating units, based on the total weight of the first amphiphilic species, preferably from 15 to 80 wt. %, more preferably from 20 to 70 wt. %, most preferably from 20 to 50 wt. %.

|3| The process according to embodiment |1| or |2|, wherein the first amphiphilic compound comprises more than 200 Daltons of ethylene oxide-based repeating units, preferably more than 300 Daltons, more preferably more than 330 Daltonss. The molecular weight of the first amphiphilic compound is preferably in the range from 200 to 20,000 Daltons more preferably in the range from 300 to 15,000 Daltons, most preferably in the range from more than 330 to 15,000 Daltons.

|4| The process according to any of the preceding embodiments, wherein the first amphiphilic compound has a molecular weight of more than 300 Daltons, preferably more than 400 Daltons, more preferably more, than 500 Daltons.

|5| The process according to any of the preceding embodiments, wherein the first amphiphilic compound satisfies on or both of the following:
a. The first amphiphilic compound comprises more than 200 Daltons of ethylene oxide-based repeating units, preferably more than 300 Daltons, more preferably more than 330 Daltons (the molecular weight of die first amphiphilic compound is preferably in the range from 200 to 20,000 Daltons, more preferably in the range from 300 to 15,000 Daltons, most preferably in the range from more than 330 to 15,000 Daltons); and
b. The first amphiphilic compound has a molecular weight of more than 300 Daltons, preferably more than 400 Daltons, more preferably more than 500 Daltons.

|6| The process according to any of the preceding embodiments, wherein the first amphiphilic compound comprises a further repeating unit. In one aspect of this embodiment, the compound comprises two or more distinct further repeating units.

|7| The process according to embodiment |6|, wherein the further repeating unit is based on one selected from the group consisting of propylene oxide, butylene oxide, ethylene, propylene and butylene, preferably propylene oxide.

|8| The process according to any of the proceeding embodiments, wherein the first carbon source compound comprises a ring.

|9| The process according to any of the preceding embodiments, wherein the first carbon source compound comprises an aromatic ring with one or more hydroxyl groups connected thereto.

|10| The process according to any of the preceding embodiments, wherein the first carbon source compound is a novolac resin.

|11| The process according to any of the preceding embodiments, wherein the ratio of the amount by weight of carbon source to the amount by weight of the amphiphilic species is in the range from 10:1 to 1:10, preferably in, the range from 8:1 to 1:5, also preferably in the range from 5:1 to 1:3, more preferably in the range from 5:2 to 1:2.

|12| The process according to any of the preceding embodiments, Wherein the precursor comprises a cross-linking agent.

|13| The process according to any of the preceding embodiments, wherein the precursor comprises a solvent or a dispersant or both.

|14| The process according to any of the preceding embodiments, wherein heating step d. is started within 1 hour of the contacting step c., preferably within 20 minutes, more preferably within 10 minutes, most preferably within 1 minute.

|15| The process according to any of the preceding embodiments, wherein the heating step d. is performed at a temperature in the range from 700 to 3,000° C. preferably in the range from 725 to 2,800° C., more preferably in the range from 750 to 2,500° C.

|16| A porous carbon material can be obtained by the process of any of the preceding embodiments. In one aspect of this embodiment, the porous carbon material preferably has the feature of the below-described embodiment |17| or one or more of the features of embodiment |18|, or the feature of embodiment |17| and one or more of the features of embodiment |18|.

|17| A porous carbon material having a pore diameter distribution with a mode in the range from 50 to 280 nm preferably in the range from 60 to 270 nm, more preferably in the range from 70 to 260 nm, still more preferably in the range from 80 to 250 nm, most preferably in the range from 90 to 200 nm.

The features of embodiment |17| preferably also apply to the porous carbon material of the above process and the porous carbon material obtained by any of the preceding process embodiments. Furthermore, the features of embodiment |17| are combined with any feature of the above porous carbon material embodiments and process embodiments. Each of these combinations constitutes a single aspect of the invention.

|18| A porous carbon, material having at least one of the following features:
a. A total pore volume in the range from 0.4 to 2.8 $cm^3/g$, preferably in the range from 0.65 to 2 $cm^3/g$, more preferably in the range from 0.7 to 1.75 $cm^3/g$, for pores having a diameter in the range from 10 to 10.000 nm:
b. A $BET_{TOTAL}$ in the range 10 to 1,000 $m^2/g$, preferably in the range from 20 to 1,000 $m^2/g$, also preferably in the range from 20 to 900 $m^2/g$, more preferably in the range from 25 to 800 $m^2/g$;
c. A $BET_{MICRO}$ in the range from 0 to 650 $m^2/g$, preferably in the range from 5 to 600 $m^2/g$, more preferably in the range from 10 to 550 $m^2/g$;
d. A skeletal density in the range from 1.9 to 2.1 $g/cm^3$, preferably in the range from 1.92 to 2 $g/cm^3$, more preferably in the range from 1.94 to 1.98 $g/cm^3$;
e. A $d_{50}$ for primary particle diameter in the range from 300 nm to 300 μm, preferably in the range from, 400 nm to 200 μm, more preferably in the range from 500 nm to 100 μm.

The features of embodiment |18| preferably also apply to the porous carbon material of the above process and the porous carbon material obtained by any of the preceding process embodiments. Furthermore, the features of embodiment |18| are combined with any feature of the above porous carbon material embodiments and process embodiments. Each of these combinations constitutes a single aspect of the invention.

|19| A device comprising the porous carbon material according to any of the embodiments |16| to |18|. Preferred devices are capacitors and electrochemical cells. Preferred capacitors are double layer capacitors. Preferred electrochemical cells are lead-acid cells, fuel cells and lithium ion cells.

|20| A use of an amphiphilic compound, for the preparation of a porous carbon material, wherein the amphiphilic compound comprises two or more adjacent ethylene oxide-based repeating units, preferably 5 or more, more preferably 7 or more, still more preferably 20 or more, or 30 or more, or 50 or more. The amphiphilic compound might comprise up to about 1,000 adjacent ethylene oxide-based repeating units. Preferred features for the amphiphilic compound described in the context of the process of the invention and elsewhere in this document are also preferred features of the amphiphilic compound of this embodiment.

In one aspect of this embodiment, two or more amphiphilic compounds are employed in the preparation, preferably each comprising two or more adjacent ethylene oxide-based repeating units, preferably 5 or more, more preferably 7 or more, still more preferably 20 or more, or 30 or more, or 50 or more. The amphiphilic compound might comprise up to about 1,000 adjacent ethylene oxide-based repeating units.

|21| A use of a porous carbon material according to any of the embodiments |16| to |18|, for improving the properties of an electrical device. Preferred electrical devices in this context are electrochemical cells, capacitors, electrodes and fuel cells.

|22| A use of a porous carbon material according to any of the embodiments |16| to |18|, for improving ion transport in an electrical device. Preferred electrical devices in this context are electrochemical cells, capacitors, electrodes and fuel cells.

|23| A use of a porous carbon material according to any of the embodiments |16| to |18|, for improving power density by enhancing ion diffusivity in electrodes of lithium ion batteries.

|24| A use of a porous carbon material according to any of the embodiments |16| to |18|, for improving energy density by enabling increased electrode thickness in lithium ion batteries.

|25| A use of a porous carbon material according to any of the embodiments |16| to |18|, for reducing the drying time of electrodes to be used in lithium ion batteries.

|26| A use of a porous carbon material according to any of the embodiments |16| to |18|, for reducing the electrolyte filling time of electrodes in lithium ion batteries.

|27| A use of a porous carbon material according to any of the embodiments |16| to |18|, for improving power density by enhancing ion diffusivity in electrodes of electric capacitors.

|28| A use of a porous carbon material according to any of the embodiments |16| to |18|, for improving energy density by enabling increased electrode thickness in electric capacitors.

|29| A use of a porous carbon material according to any of the embodiments |16| to |18|, for improving cycle life in lead acid batteries.

|30| A use of a porous carbon material according to any of the embodiments |16| to |18|, for improving deep-discharge capacity in lead acid batteries.

|31| A use of a porous carbon material according to any of the embodiments |16| to |18|, for improving dynamic charge acceptance in lead acid batteries.

|32| A use of a porous carbon material according to any of the embodiments |16| to |18|, for improving cycle life in fuel cells.

|33| A use of a porous carbon material according to any of the embodiments |16| to |18|, for improving the low temperature conductivity of electrolytes in lithium ion batteries.

|34| A use of a porous carbon material according to any of the embodiments |16| to |18|, for improving the water transport in fuel cells.

In one embodiment of the process, the carbon source and the amphiphilic species together are at least 90 wt. % of the precursor, based on the total weight of the precursor, preferably at least 95 wt. %, more preferably at least 99 wt. %. Most, preferably, the precursor contains only the carbon source and the amphiphilic species.

It is to be understood that both the foregoing general description and the following detailed description are exemplary, but are not restrictive, of the disclosure.

BRIEF DESCRIPTION OF THE FIGURES

The invention is now further elucidated with reference to the figures. The figures and figure descriptions are exemplary and are not to be considered as limiting the scope of the invention.

DETAILED DESCRIPTION

Figure 1:
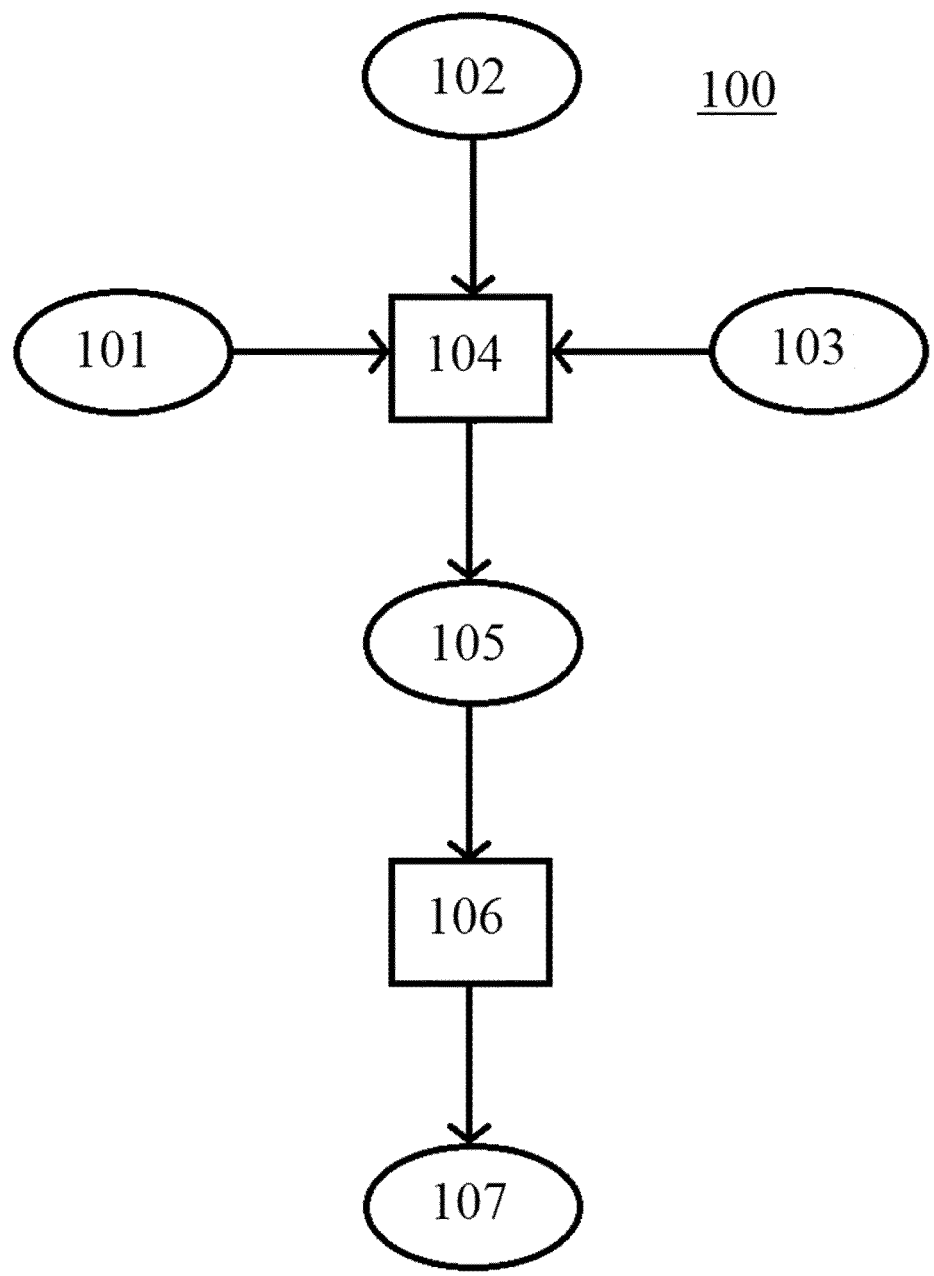
FIG. 1 shows a schematic representation of a process for preparing a porous carbon material.

Throughout this document disclosures of ranges are to be understood to include both end points, of the range. Furthermore, each disclosure of a range in the description is to be understood as also disclosing preferred sub-ranges in which one end point is excluded or both end points are excluded. For example, disclosure of the range from 5 to 10 kg is to be understood as disclosing a range including the end points 5 kg and 10 kg. Furthermore, it is to be understood as also disclosing a range including the end point 5 kg but excluding the end point 10 kg, a range excluding the end point 5 kg but including the end point 10 kg and a range excluding both end points 5 kg and 10 kg.

Throughout this document, phrases in the form "A comprises only B" or "A is B" are to be understood as meaning that A comprises B and is essentially free of any other constituents. Preferably A in such case comprises less than 10 wt. %, more preferably less than 1 wt. %, still more preferably less than 0.1 wt. % of other constituents, based on the total weight of A. It is most preferred for A to be free of any constituents other than B. This concept generalizes to an A having two or more constituents, such as in phrases of the general form "A comprises only B and C" and "A is B and C." In such a case, A preferably comprises less than 10 wt. %, more preferably less than 1 wt. %, still more preferably less than 0.1 wt. % of constituents other than B and C, based on the total weight of A. It is most preferred for A to be free of any constituents other than B or C.

Similarly, phrases of the general form "A does not comprise B" are to be understood as meaning that A is essentially free all, Preferably A in such case comprises less than 10 wt. %, more preferably less than 1 wt. %, still more preferably less than 0.1 wt. % of B, based on the total weight of A. It is most preferred for A to be free of B. This concept generalizes to an A which comprises none of a group of two or more specified constituents, such as a group of the general form "B and C." Preferably A in such a case comprises a total amount of B and C of less than 10 wt. %, more preferably less than 1 wt. %, still more preferably less than 0.1 wt. %, based on the total weight of A. It is most preferred for A to be free either B or C or both, preferably both.

The precursor of the present invention may comprise a solvent or a dispersant or both. In this document, the term solvent is used as a general term and, in particular, can refer to a solvent itself or to a dispersant or to both. In particular, preferred features described in the context of a solvent are also preferred features for a dispersant.

Compounds in the context of the present document preferably are describable as a stoichiometric combination of elements. Preferred compounds may be molecules or ions or molecular ions.

Process

One aspect of the invention is a process for preparing a porous carbon material comprising the process steps:

a. providing a carbon source comprising a first carbon source compound;

b. providing an amphiphilic species comprising a first amphiphilic compound, the first amphiphilic compound comprising two or more adjacent ethylene oxide-based repeating units;

c. contacting the carbon source and the amphiphilic species to obtain a precursor; and d. heating the precursor to obtain the porous carbon material.

The precursor comprises the carbon source and the amphiphilic species. In one embodiment, the precursor comprises one or more further constituents other than the carbon source and the amphiphilic species. In another embodiment, the precursor comprises just the carbon source and the amphiphilic species.

Further constituents for the precursor may be any which the skilled person considers appropriate in the context of the invention. Preferred further constituents are one or more selected from the group consisting of a solvent and a cross-linking agent.

Where further constituents are present in the precursor, they are considered to be separate from the carbon source and from the amphiphilic species, for example for the purposes of calculating proportions by mass. For example, where a carbon source is prepared in a solvent and introduced to the other constituent or other constituents of the precursor as a solution, the solvent is considered in the context, of this disclosure to be a further constituent, and does not count as part of the carbon source.

Amphiphilic Species

The amphiphilic species of the present invention preferably serves to direct the formation of a three-dimensional structure from the carbon source. The amphiphilic species is preferably present in the precursor in the fora of micelles and three-dimensional structures and preferably leads to the formation of pores in the resulting porous carbon material.

The amphiphilic species preferably comprises a first amphiphilic compound, the first amphiphilic compound comprising two or more adjacent ethylene oxide-based repeating units. In one embodiment of the invention, the amphiphilic species comprises the first amphiphilic compound only. In another embodiment, the amphiphilic species comprises the first amphiphilic compound and one or more further amphiphilic compounds, or two or more, or three or more, or four or more further amphiphilic compounds. It is preferred that the further amphiphilic compounds each comprise two or more adjacent ethylene oxide-based repeating units. Herein, preferred features disclosed in relation to the amphiphilic compound are preferred features for the first amphiphilic compound. Where one or more further amphiphilic compounds are present in the amphiphilic species, the preferred features disclosed in relation to the amphiphilic compound or to the first amphiphilic compound are also preferred features for one or more of, preferably all of the further amphiphilic compounds.

Preferred amphiphilic compounds possess both hydrophilic and lipophilic behavior.

Hydrophilic Behavior

The two or more adjacent ethylene oxide-based repeating units contribute to the hydrophilic behavior of the amphiphilic compound. In one embodiment, the hydrophilic behavior is exclusively due to the ethylene oxide-based repeating units. In another embodiment, a contribution is made to the hydrophilic behavior of the amphiphilic compound by something other than ethylene oxide-based repeating units, preferably provided by one or more selected from the group consisting of a charged group and a polar uncharged group. Preferred polar, uncharged groups comprise one or, more selected from the group consisting of O, S, N, P, F, Cl, Br and I. More preferred polar uncharged groups comprise O. Examples of preferred polar uncharged groups are hydroxyl, carboxyl, carbonyl, aldehyde, ester, ether, peroxy, haloformyl, carbonate ester, hydroperoxyl, hemiacetal, hemiketal, acetal, ketal, orthoester, methylenedioxy, orthocarbonate ester, sulphhydryl, sulphide, disulphide, sulphinyl, sulphonyl, sulphino, sulpho, thiocyanate, isothiocyanate, carbonothioyl, phosphine, phosphorto, phosphate, carboxamide, amine, ketamine, adimine, imide, azide, azo, cyanate, isocyanate, nitrate, nitrile, isonitrile, nitrosooxy, nitro, nitroso, oxime, pyridyl, chloro, bromo and iodo. Preferred polar uncharged groups are hydroxyl and ester, more preferably hydroxyl. Preferred charged groups can be cationic or anionic. Examples of preferred anionic groups are carboxylate, sulphate, sulphonate and phosphate, more preferably carboxylate. Preferred cationic groups are ammonium.

The lipophilic behavior of the amphiphilic compound is preferably provided by one or more hydrocarbon moieties or one or more poly-ether moieties different from poly ethylene oxide or one or more of each.

Preferred hydrocarbon moieties may be saturated or unsaturated. A preferred saturated hydrocarbon is an alkane. Preferred alkanes may be linear, branched, cyclic or a mixture thereof. Preferred unsaturated hydrocarbon moieties comprise one or more carbon-carbon double bonds or one or more aromatic rings or one or more of each. A preferred hydrocarbon comprises a carbon chain or two or more carbon chains, each carbon chain preferably having 5 or more carbon atoms, more preferably 10 or more carbon atoms, most preferably 20 or more carbon atoms. The carbon chain preferably comprises one or more selected from the group consisting of a straight carbon chain, a branched carbon chain and a carbon ring. The carbon chain preferably comprises a straight carbon chain, preferably is a straight carbon chain. Preferred carbon chains in this context may comprise one or more selected form the group consisting of an alkane unit, an alkene unit, and an alkyne unit. The carbon chain preferably comprises an alkane unit, more preferably is an alkane.

Repeating Units

The amphiphilic compound comprises two or more adjacent ethylene oxide-based repeating units. The ethylene oxide-based repeating unit preferably has the formula —($CH_2CH_2O$)—. The amphiphilic compound preferably comprises two or more, preferably 5 or more, more preferably 10 or more, still more preferably 20 or more, most preferably 50 or more ethylene oxide-based repeating units. In one aspect of this embodiment, the amphiphilic compound comprises one or more blocks of ethylene oxide-based repeating units, each block comprising two or more, preferably 5 or more, more preferably 10 or more, still more preferably 20 or more, most preferably 50 or more ethylene oxide-based repeating units connected directly in a chain.

In one embodiment, it is preferred for the amphiphilic compound to comprise one or more of a further repeating unit, the further repeating unit being different from an ethylene oxide-based repeating unit.

The further repeating unit is preferably a propylene oxide-based repeating unit. The propylene oxide-based repeating unit preferably has the formula —($CHCH_3CH_2O$)—. The amphiphilic compound preferably comprises two or more, preferably 5 or more, more preferably 10 or more, still more preferably 20 or more, most preferably 50 or more of the further repeating unit. In one aspect of this embodiment, the amphiphilic compound comprises one or more blocks of the further repeating unit, each block comprising two or more, preferably 5 or more, more preferably 10 or more, still more preferably 20 or more, most preferably 50 or more of the further repeating unit connected directly in a chain.

The amphiphilic compound may comprise a butylene oxide-based repeating unit, preferably two or more, more preferably 5 or more, still more preferably 10 or more, even more preferably 20 or more, most preferably 50 or more of the butylene oxide-based repeating unit. In one aspect of this embodiment, the amphiphilic compound comprises one or more blocks of the butylene oxide-based repeating unit, each block comprising two or more., preferably 5 or more, more preferably 10 or more, still more preferably 20 or more, most preferably 50 or more of the butylene oxide-based repeating unit connected directly in a chain.

In one embodiment, it is preferred for the amphiphilic compound to comprise one or more ethylene oxide-based repeating units and one or more of a further repeating unit, the further repeating unit being different from an ethylene oxide-based repeating unit. The further repeating unit is preferably a propylene oxide-based repeating unit. The propylene oxide-based repeating unit preferably has the formula —($CHCH_3CH_2O$)—. The amphiphilic compound preferably comprises two, or more, more preferably 5 or more, still more preferably 10 or more, even more preferably 20 or more, most preferably 50 or more ethylene oxide-based repeating units. In one aspect of this embodiment, the amphiphilic compound comprises one or more blocks of ethylene oxide-based repeating units, each block comprising two or more, preferably 5 or more, more preferably 10 or more, still more preferably 20 or more, most preferably 50 or more ethylene oxide-based repeating units connected directly in a chain. The amphiphilic compound preferably comprises two or more, preferably 5 or more, more preferably 10 or more, still more preferably 20 or more, most preferably 50 or more of the further repeating unit. In one aspect of this embodiment, the amphiphilic compound comprises one or more blocks of the repeating unit, each block comprising two or more, preferably 5 or more, more preferably 10 or more, still more preferably 20 or more, most preferably 50 or more of the further repeating unit connected directly in a chain. In a preferred aspect of this embodiment, the amphiphilic compound comprises one or more blocks of ethylene oxide-based repeating units and one or more blocks of the further repeating unit. In one aspect of this embodiment, the amphiphilic compound comprises one or more ethylene oxide-based repeating units and two or more further repeating units. One of the two or more further repeating units is preferably a propylene oxide-based repeating unit. It is particularly preferred that the amphiphilic compound comprises one or more blocks of each of the ethylene oxide-based repeating unit and the two or more further repeating units.

In one preferred embodiment the amphiphilic compound is a block copolymer comprising one or more hydrophilic blocks and one or more hydrophobic blocks. The preferred hydrophilic block is an ethylene oxide-based repeating unit. Preferred hydrophobic blocks are a propylene oxide-based block, a butylene oxide-based block, or a hydrocarbon block, preferably a propylene oxide-based block or a hydrocarbon block. Preferred block copolymers are diblock copolymers of the form AB or triblock copolymers of the form ABA or BAB.

In one embodiment, the amphiphilic compound is a triblock copolymer of the form ABA, wherein A is an ethylene oxide-based block and B is either a propylene oxide-based block or a hydrocarbon.

In one embodiment, the amphiphilic compound is a triblock copolymer of the form BAB, wherein A is an ethylene oxide-based block and B is either a propylene oxide-based block or a hydrocarbon.

In one embodiment, the amphiphilic compound is a diblock copolymer of the form AB, wherein A is an ethylene oxide-based block and B is either a propylene oxide-based block or a hydrocarbon.

In one embodiment, the amphiphilic compound is a mixed triblock copolymer of the form BAC, wherein A is an ethylene oxide-based block, B and C are different and each chosen from the group consisting of a propylene oxide-based block and a hydrocarbon.

In one embodiment, the amphiphilic compound is a block copolymer, preferably as above, with one or more terminal groups, preferably selected from the group consisting of a hydrocarbon, sulphate, phosphate, an amine, carboxylate and an ammonium salt.

In one embodiment, the amphiphilic species may be provided in a solvent. In this case, the solvent is separate from the amphiphilic species for the purposes of calculating properties of the amphiphilic species, such as content by weight in the precursor.

A contribution to achieving one or more of the objects of the invention is made by a process for preparing a porous carbon material comprising the process steps:

a. providing a carbon source comprising a first carbon source compound;
b. providing an amphiphilic species comprising a first amphiphilic compound;
c. contacting the carbon source and the amphiphilic species to obtain a precursor; and
d. heating the precursor to obtain the porous carbon material;

wherein the first amphiphilic compound has an HLB (hydrophile-lipophile balance) value measured by the Griffin Method in the range from 1 to 19, preferably in the range from 2 to 19, more preferably in the range from 4 to 19, still more preferably in the range from 6 to 17, most preferably in the range from 8 to 15. In one embodiment, preferred amphiphilic compounds have an measured by the Griffin Method of 1 or more; or more than 1; or 2 or more; or more than 2; or 4 or more; or more than 4. The above-mentioned embodiments also apply to this contribution. This holds in particular for embodiments |2| et seq.

A contribution to achieving one or more of the objects of the invention is made by a process for preparing a porous carbon material comprising the process steps:
a. providing a carbon source comprising a first carbon source compound;
b. providing an amphiphilic species comprising a first amphiphilic compound;
c. contacting the carbon source and the amphiphilic species to obtain a precursor; and
d. heating the precursor to obtain the porous carbon material;

wherein the first amphiphilic compound has an HLB value measured by the Reference Method described in the test methods in the range from 1 to 19, preferably in the range from 2 to 19, more preferably in the range from 4 to 19, still more preferably in the range from 6 to 17, most preferably in the range from 8 to 15. In one embodiment, preferred amphiphilic compounds have an HLB measured by the Reference Method described in the test methods of 1 or more; or more than 1; or 2 or more; or more than 2; or 4 or more; or more than 4. The above-mentioned embodiments also apply to this contribution. This holds in particular for embodiments |2| et seq.

A contribution to achieving one or more of the Objects of the invention is made by a process for preparing a porous carbon material comprising the process steps:
a. providing a carbon source comprising a first carbon source compound;
b. providing an amphiphilic species comprising a first amphiphilic compound;
c. contacting the carbon source and the amphiphilic species to obtain a precursor; and
d. heating the precursor to obtain the porous carbon material;

wherein the first amphiphilic compound has an HLB value measured by the Davies Method of 1 or more; or more than 1; or 2 or more; or more than 2; or 4 or more; or more than 4; or 6 or more; or more than 6; or 8 or more; or more than 8. Some amphiphilic compounds can have an HLB value measured by the Davies Method of up to 100. The above-mentioned embodiments also apply to this contribution. This holds in particular for embodiments |2| et seq.

A contribution to achieving one or more of the objects of the invention is made by a process for preparing a porous carbon material comprising the process steps:
a. providing a carbon source comprising a first carbon source compound;
b. providing an amphiphilic species comprising a first amphiphilic compound;
c. contacting the carbon source and the amphiphilic species to obtain a precursor; and
d. heating the precursor to obtain the porous carbon material;

wherein the first amphiphilic compound has an HLB value measured by the Effective Chain Length Method (Guo et al., Journal of Colloid and Interface Science 298, 441-450 (2006)) of 1 or more; or more than 1; or 2 or more; or more than 2; or 4 or more; or more than 4; or 6 or more; or more than 6; or 8 or more; or more than 8. Some amphiphilic compounds can have an HLB value measured by the Effective Chain Length Method of up to 100. The above-mentioned embodiments also apply to this contribution. This holds in particular for embodiments |2| et sen.

In one embodiment, 0.5 g of the amphiphilic species satisfies one or more of the following criteria immediately after shaking in 10 ml of distilled water, preferably determined according to the test method described herein:
a. gas bubbles are present;
b. only one non-gas phase is present; and
c. only one non-gas phase is present and this phase is liquid and, clear.

Clear in this context preferably means producing an obscuration of less than 0.1% according to the method given herein. In the various aspects of this embodiment, the following combinations are satisfied: a, b, c, b+c, a+b, a+c or a+b+c. It is preferred for at least c to be satisfied.

Gas bubbles can be present within the body of another phase or may accumulate at the top of another phase to form a foam.

In one embodiment, 0.5 g of the amphiphilic species satisfies one or more of the following criteria 5 minutes after shaking in 10 ml of distilled water, preferably determined according to the test method described herein:
a. only one non-gas phase is present; and
b. only one non-gas phase is present and this phase is liquid and clear.

Clear in this context preferably means producing an obscuration of less than 0.1 according to, the method given herein. it is preferred for at least b to be satisfied.

In one embodiment, 0.5 g of the amphiphilic species satisfies one or more of the following criteria 10 minutes after shaking in 10 ml of distilled water, preferably determined according to the test method described herein:
a. only one non-gas phase is present; and
b. only one on-gas phase is present and this phase is liquid and clear.

Clear in this context preferably means producing an obscuration of less than 0.1% according to the method given herein. It is preferred for at least b to be satisfied.

In one embodiment, 0.5 g of the amphiphilic species satisfies one or more of the following criteria 1 hour after shaking in 10 ml of distilled water, preferably determined according to the test method described herein:
a. only one non-gas phase is present; and
b. only one ion-gas phase is present and this phase is liquid and clear.

Clear in this context preferably means producing an obscuration of less than 0.1% according to the method given herein. It is preferred for at least b to be satisfied.

In one embodiment, 0.5 g of the amphiphilic species satisfies one or more of the following criteria 1 day after shaking in 10 ml of distilled water, preferably determined according to the test method described herein:

a. only one non-gas phase is present; and
b. only one non-gas phase is present and this phase is liquid and clear.

Clear in this context preferably means producing an obscuration of less than 0.1% according to the method given herein. It is preferred for at least b to be satisfied.

Carbon Source

The carbon source of the present invention preferably provides the carbon material for the formation of a three-dimensional structure. This three-dimensional structure preferably has open pores and also preferably channels, preferably built by connecting open pores. The invention can in principle be carried out using any carbon source known to the skilled person and which the artisan considers appropriate in the context of the invention.

The carbon source preferably comprises a first carbon source compound. In one embodiment of the invention, the carbon source comprises the first carbon source compound only. In another embodiment, the carbon source comprises the first carbon source compound and one or more further carbon source compounds, or two or more, or three or more, or four or more further carbon source compounds. Herein, preferred features disclosed in relation to the carbon source compound are preferred features for the first carbon source compound. Where one or more further carbon source compounds are present in the carbon source, the preferred features disclosed in relation to the carbon source compound or to the first carbon source compound are also preferred features for one of more of, preferably all of the further carbon source compounds.

The carbon source compound may be selected by the skilled person in such a manner as to provide a porous carbon product with the properties which the artisan desires.

In one embodiment, the carbon source compound comprises one or more rings. In one aspect of this embodiment the ring is a carbon ring. In another aspect of this embodiment, the ring comprises carbon and one or more hetero atoms. Preferred hetero atoms in this context are one or more selected form the group consisting of O, S, N, P and Si, preferably from the group consisting of O and N, most preferably O. The ring may be aromatic or non-aromatic, preferably aromatic. The ring may be saturated or unsaturated, preferably at least partially saturated. The ring preferably has a number of member atoms in the range from 3 to 9, preferably in the range from 4 to 7, more preferably 5 or 6. In one aspect of this embodiment, the ring has 5 member atoms. In another aspect of this embodiment, the ring has 6 member atoms. In one aspect of this embodiment, the ring is comprised in a ring system, wherein the ring shares one or more edges with one or more further rings in the ring system. Examples of preferred carbon rings in this context are: benzene, cyclohexane, cyclopentane, singularly unsaturated cyclopentane, doubly unsaturated cyclopentane, cycloheptane, singularly unsaturated cycloheptane, doubly unsaturated cycloheptane, triply unsaturated cycloheptane, cyclooctane, singularly unsaturated cyclooctane, doubly unsaturated cyclooctane, triply unsaturated cyclooctane, four times unsaturated cyclooctane cyclononane, singularly unsaturated cyclononane, doubly unsaturated cyclononane, triply unsaturated cyclononane, four times unsaturated cyclononane, cyclobutene, singly unsaturated cyclobutene doubly unsaturated cyclobutene and cyclopropane, preferably benzene, cyclohexane and cyclopentane, more preferably benzene. Preferred ring systems are naphthalene, biphenyl, fluorene, phenalene, acenaphthylene, acenaphthene, phenanthrene, fluoranthene, pyrene and decalin, preferably naphthalene and decalin most preferably naphthalene. Preferred rings comprising one or more hetero atoms are formed by replacing one carbon atom in one of the preferred carbon rings described above with a hetero atom, preferably from the preferred list of hetero atoms. Examples of preferred rings comprising hetero atoms are: piperidine pyridine, tetrahydropyran, pyran, thiane thiopyran, silinane, saline, phosphinane, phosphinine, piperazin, diazine, morpholine, oxazine, thiomorpholine, thiazine, dioxane, doioxine, dithiane, dithiin, hexahydro-1,3,5-triazine, triazine, tiloxane, trithiane, tetrazine, pentazine, pyrrolidine, pyrrole, tetrahydrofuran, furan, tetrahydrothlophene, thiophene phosphoiane, phosphole, silacyclopentane, silole, imidazolidine, pryazolidine, imidazole, pyrazole, oxazolidine, isoxazolidine, oxazole, isoxazole, thiazolidine, isothiazolidine, thiazole, isothiazole, dioxolane, dithiolane, azetidine, azete, oxetane, exete, thietane and thiete, preferably pyridine, tetrahydropyran, pyran, thiane, thiopyran, pyrrolidine, pyrrole, tetrahydrofuran, furan, thiophene and tetrahydrothiophene. All of the above rings may be substituted in one or more positions, either to the rest of the compound or to one or more functional groups, or to both.

Preferred functional groups attached to the ring are one or more selected from the group consisting of hydroxyl, carboxyl, carbonyl, aldehyde, ester, ether, peroxy, haloformyl, carbonate ester, hydroperoxyl, hemiacetal, hemiketal, acetal, ketal, orthoester, methylenedioxy, orthocarbonate ester, sulphhydryl, sulphide, disulphide, sulphinyl, sulphonyl, sulphino, sulpho thiocyanate, isothiocyanate, carbonothioyl, phosphino, phosphono, phosphate, carboxamide, amine, ketamine, adimine, imide, azide, azo, cyanate, isocyanate, nitrate, nitrite, isonitrile, nitrosooxy, nitro, nitroso, oxime, pyridyl, chloro, bromo, iodo, carboxylate, sulphate, sulphonate and phosphate and ammonium. The preferred functional group attached to the ring is hydroxyl.

A preferred carbon source is a phenolic resin. A phenolic resin is preferably prepared from a phenol and a co-condensation species.

In one embodiment of the invention the carbon source comprises a phenolic resin, preferably a novolac resin.

In another embodiment of the invention, the carbon source comprises a precursor mixture to a phenolic resin, preferably a precursor mixture to a phenolic resin, the precursor preferably comprising a phenol and a co-condensation species, wherein the phenol is preferably in excess of the co-condensation species by mols.

For each of the following preferred phenolic resins, a precursor mixture to the phenolic resin is also a preferred carbon source.

Preferred co-condensation species are aldehydes or ketones, preferably aldehydes. Preferred co-condensation species are one or more selected from the group consisting of the following: formaldehyde, acetaldehyde, propionaldebyde, butylaldehyde, furfural, glyoxal, benzaldehyde, and a ketone. The preferred co-condensation species is formaldehyde.

Preferred phenols comprise a benzene ring with one or more attached OH groups. Preferred phenols are one or more selected from the group consisting of the following: phenol (hydroxybenzene), o-cresol (1-methyl-2-hydroxybenzene), m-cresol (1-methyl-3-hydroxybenzene), p-cresol (1-methyl-4-hydroxybenzene), p-tert butylphenol (1-tert-butyl-4-hydroxybenzene), p-tert octylphenol (i-tert-octyl-4-hydroxybenzene), p-tert nonylphenol (1-nonyl-4-hydroxybenzene), 2,3-xylenol (1,2-dimethyl-3-hydroxybenzene), 2,4-xylenol (1,3-dimethyl-4-hydroxybenzene), 2,5-xylenol (1,4-dimethyl-2-hydroxybenzene), 2,6-xylenol (1,3-dimethyl-2-hydroxybenzene), 3,4-xylenol (1,2-dimethyl-4- hydroxybenzene), 3,5-xylenol (1,3-dimethyl-5-hydroxybenzene), resorcinol (1,3-dihydroxybenzene), bisphenol-A (2,2-dis(4-hydroxyphenyl)propane), preferably phenol, o-cresol, m-cresol, p-cresol or resorcinol, more preferably resorcinol or phenol, most preferably resorcinol.

Preferred phenolic resins are novolac resins.

Preferred phenolic resins are prepared from an excess of a phenol over the co-condensation species by viols, preferably with a ratio of the phenol to the co-condensation species above 1:1, preferably above 1.5:1, more preferably above 2:1.

Preferred phenolic resins are prepared in acid, preferably at a pH below 7, more preferably below 4, still more preferably below 3, most preferably below 2.5.

Preferred phenolic resins are acidic, preferably having a pH below 7, more preferably below 4, still more preferably below 3, most preferably below 2.5.

In one embodiment, the carbon source preferably comprises a resin of phenol and formaldehyde.

In one embodiment, the carbon source preferably comprises a resin of resorcinol and formaldehyde.

Preferred phenolic resins comprise from 1 to 30 aromatic rings, preferably 2 to 20 aromatic rings, more preferably from 5 to 15 aromatic rings.

Preferred phenolic resins are straight chains.

Preferred phenolic resins are not resoles.

The preferred carbon source compound is a novolac-type resin or a derivative thereof, preferably from a resorcinol-formaldehyde reaction or a phenol-formaldehyde reaction, more preferably from a resorcinol-formaldehyde reaction.

In one embodiment, the carbon source is dispersed in water. In one preferred embodiment, the carbon source comprises a novolac resorcinol-formaldehyde resin dispersed in water. In one aspect of this embodiment, the carbon source is a novolac resorcinol-formaldehyde resin dispersed in water.

In one embodiment, the carbon source may be provided in a solvent preferably dissolved or dispersed. In this case, the solvent is considered to be separate from the carbon source for the purposes of calculating properties of the carbon source, such as content by weight in the precursor. In another embodiment, the carbon source is introduced to the other constituents of the precursor as such, preferably in the absence of a solvent.

The carbon source may be present in a solid or a liquid state. The carbon source may also be present in a viscous state which shares some behavior with a solid and some behavior with a liquid. The individual carbon source compounds may each be present in a solid or a liquid state. The individual carbon source compounds may each also be present in a viscous state which shares some behavior with a solid and some behavior with a liquid.

A contribution to achieving one or more of the objects of the invention is made by a process for preparing a porous carbon material comprising the process steps:
a. providing a carbon source comprising a first carbon source compound:
b. providing an amphiphilic species comprising a first amphiphilic compound;
c. contacting the carbon source and the amphiphilic species to obtain a precuisor; and
d. heating the precursor to obtain the porous carbon material;
wherein the first carbon source compound is a novolac resin. The above-mentioned embodiments also apply to this contribution. This holds in particular for embodiments |2| et seq.

A contribution to achieving one or more of the objects of the invention is made by a process for preparing a porous carbon material comprising the process steps:
a. providing a carbon source;
b. providing an amphiphilic species comprising a first amphiphilic compound;
c. contacting the carbon source and the amphiphilic species to obtain a precursor; and
d. heating the precursor to obtain the porous carbon material;
wherein the first carbon source comprises a precursor mixture for a novolac resin, the precursor preferably comprising a phenol and a co-condensation species, wherein the phenol is preferably in excess of the co-condensation species by mots. The above-mentioned embodiments also apply to this contribution. This holds in particular for embodiments |2| et seq.

Solvent/Dispersant

One or more solvents or dispersants may be present in the precursor. Solvents and dispersants are preferably liquids. Solvents and dispersants in this context preferably dissolve or disperse one or more of the constituents of the precursor, either prior to or after formation of the precursor. Preferred features of the solvent are described herein and these features are also preferred features of a dispersant. A solvent may be introduced to the other constituents of the precursor as such or as a solvent for one or more of the other constituents of the precursor prior to formation of the precursor. If one or more solvents are employed they are considered to be separate from other constituents of the precursor for the purpose of calculating content by weight, even if they are employed as a solvent therefor prior to formation of the precursor. For example, if the carbon source is introduced to the other constituents of the precursor in the form of a solution or dispersion of the carbon source in a carbon source solvent, the content of the carbon source in the precursor is calculated excluding the content of the carbon source solvent. This also applies, in particular, for the amphiphilic species and the co-ordinating species where one is present.

Solvents may be any solvent known to the skilled person and which the artisan considers appropriate in the context of the invention, in particular, solvents which are selected for their capability to dissolve or disperse one or more of the constituents of the precursor. Solvents may be organic or inorganic. A preferred solvent has a boiling point. Solvents preferably vaporize without leaving a residue when heated to above their boiling point. The preferred inorganic solvent is water. Preferred organic solvents are alcohols, ethers, aldehydes, esters or ketones, preferably alcohols. Preferred alcohols are methanol, ethanol or propanol, preferably ethanol. Another preferred organic solvent is acetone.

In one embodiment, the precursor does not comprise a solvent.

Cross-Linking Agent

One or more cross-linking agents may be present in the precursor. Preferred cross-linking agents serve the purpose of facilitating the joining together of the carbon source into a three-dimensional structure in the porous carbon material. A cross-linking agent can be a catalyst, preferably a polymerization catalyst for the carbon source.

Cross-linking agents may be any compound known to the skilled person which the artisan considers appropriate in the context of the invention, in particular, compounds which are selected for their capability for facilitating the joining together of the carbon source.

Preferred cross-linking agents comprise two or more functional groups. Preferred functional groups are able to form a link to the carbon source.

Preferred cross-linking agents are one or more selected from the group consisting of para toluene sulphonic acid, hexamethylenetetramine, hexamethoxymethylmelamine and 2-nitro-2-methyl-1-propanol.

In one embodiment, the cross-linking agent is a methylene donor.

In one embodiment of the invention, the precursor comprises a cross-linking agent, preferably in the range from 1 to 20 parts by weight, more preferably in the range from 2 to 15 parts by weight, still more preferably in the range from 5 to 10 parts by weight, based on 100 parts of carbon source. In a preferred aspect of this embodiment, the cross-linking agent is a cross-linking agent for the carbon source. In one aspect of this embodiment, the cross-linking agent is a catalyst for polymerizing the carbon source. In a preferred embodiment, the precursor does not comprise a cross-linking agent. In one embodiment, the precursor does not comprise more than 10 parts by weight of cross-linking agent, more preferably not more than 1 part, still more preferably not more than 0.1 part, most preferably not more than 0.01 parts based on 100 parts of carbon source. In particular, for a desired pore volume it is preferred to have less than 10 parts, preferably less than 1 part, more preferably less than 0.1 parts, most preferably less than 0.01 parts, or even no cross-linking agent present, based on 100 parts of carbon source.

Process Conditions

The process of the invention preferably comprises a heating step. The heating step preferably serves to obtain a porous carbon material from the precursor, preferably through linking together of the carbon source.

In the heating step, one or more constituents other than the carbon source, preferably all constituents other than the carbon source, are removed from the precursor so as not to remain in the porous carbon material. Preferably one or more selected from the following group, preferably all of the members of the following group which are present in the precursor, are removed from the precursor during the heating step so as not to remain in the porous carbon material: the amphiphilic species; the solvent, if present; the cross-linking agent, if present; further constituents other than the carbon source, if present. Constituents removed from the precursor during the heating step can exit the precursor whole, for example by evaporation or sublimation, or can decompose inside the precursor whereupon the decomposition products exit the precursor.

The heating step preferably comprises a high-temperature firing. The high-temperature firing is preferably performed at a temperature in the range from 700 to 3,000° C. The purpose of the high-temperature firing step preferably serves to carbonize and potentially graphitize the carbon source, thereby obtaining the porous carbon material.

In one embodiment, the carbon source is heated at a temperature below 700° C. for melting prior to the heating step.

The precursor preferably does not require pre-polymerization before the heating step. In one embodiment of the invention, the heating step of the precursor does not comprise a low-temperature holding step of 10 minutes or more at a holding temperature in the range from 30° C. to 150° C., preferably no low-temperature holding step of 1 minute or more at a holding temperature in the range from 30° C. to 150° C.

The process of the invention may comprise a mixing step, in which two or more constituents of the precursor, or the precursor itself, is mixed. In one embodiment, the process of the invention comprises a mixing step. In another embodiment, the process of the invention does not comprise a mixing step. In one embodiment, no longer than 1 hour is spent mixing, preferably no longer than 10 minutes, more preferably no longer than 1 minute. Where the process comprises a mixing step, it is preferably completed before the heating step. Where the process comprises a high-temperature heating step, a low-temperature heating step and a mixing step, the mixing step is preferably performed prior to the low-temperature heating step and the low-temperature heating step is preferably completed before the high-temperature heating step.

A particular contribution made by the present invention is process simplicity. In particular, the present invention can obviate the need for additional steps prior to firing, in particular low-temperature heating steps or lengthy mixing steps. In one embodiment, the time between first contact between the carbon source and the amphiphilic species and the start of a firing step is less than 10 hours, preferably less than 5 hours, more preferably less than 1 hour, still more preferably less than 20 minutes, most preferably less than 5 minutes. In one aspect of this embodiment, the start of a firing step is the first time the precursor is raised to a temperature above 200° C., or above 300° C. or above 400° C., or above 500° C., or above 600° C.

The process may comprise a graphitization step, designed to modify the properties of the porous carbon material. In one embodiment, the process comprises a graphitization step following a firing step. The graphitization step is preferably performed at a higher temperature than the firing step. In another embodiment, the process does not comprise separate firing and graphitization steps. In one aspect of this embodiment, a high-temperature step is employed for both carbonization of the carbon source and graphitization of the resultant porous carbon material. Preferred temperatures for the graphitization step are in the range from 1,200 to 3,000° C., more preferably in the range from 1,500 to 2,800° C., most preferably in the range from 1,700 to 2,500° C. Where the process comprises a graphitization step, the graphitization step is preferably performed after the heating step.

Porous Carbon Material

A contribution to achieving at least one of the above-mentioned objects is made by a porous carbon material according to the present invention. It is preferred according to the invention that the carbon source is carbonized in the heating step and the porous carbon material is obtained. The porous carbon material differs from the precursor in one or more, preferably all, of the following ways: constituents of the precursor other than the carbon source are removed from the precursor during heating and are no longer present in the porous carbon material; some atoms other than carbon are removed from the carbon source during heating and are no longer present in the porous carbon material, whereby the porous carbon material has a lower proportional content of atoms other than carbon than the carbon source; the porous carbon material is a contiguous solid, in contrast to the precursor which comprises a mixture of liquids and non-contiguous solids; and the porous carbon material has a lower density than the carbon source or than the precursor or than both.

The term "contiguous solid" is used in reference to the porous carbon material to indicate that the carbon atom constituents of the porous carbon material are linked in collections of atoms Which are immoveable relative to each other, wherein those collections are larger than the molecular scale, preferably having a largest, dimension more than 100 Angstroms, more preferably more than 500 Angstroms, further more preferably more than 1,000 Angstroms, still further more preferably more than 5,000 Angstroms, most preferably more than 10,000 Angstroms. In one embodiment, the porous carbon material is present as a body having a largest dimension of at least 1 mm, preferably at least 1 cm, more preferably at least 5 cm. In another embodiment, the porous carbon material is present as a collection of particles, preferably following a step in which a single body is split into two or more bodies.

The porous carbon material preferably has the features described in the embodiments disclosed above in the summary of the disclosure.

Technological Applications

The porous carbon material can be employed in a number of technical applications, Preferred applications are the following: an electrochemical cell; a fuel cell, in particular a hydrogen fuel cell, and there in particular in proton exchange membrane; a capacitor; an electrode; and a catalyst. Preferred electrochemical cells in this context are lead acid cells and lithium ion cells. Preferred fuel cells in this context are hydrogen cells. Preferred capacitors in this context are electric double layer capacitors.

Process conditions and individual constituents can be selected to achieve desired properties of the porous carbon material while still working within the scope of the invention. For example, a graphitization step following firing can be employed for decreasing the Brunauer Emmett and Teller (BET) surface area of the porous carbon material.

The porous carbon material preferably has the properties described in the embodiments section.

In one embodiment, the porous carbon material has one or more, preferably all, of the following features:

a. $BE_{TOTAL}$ of less than 300 m$^2$/g, preferably less than 200 more preferably less than 150 m$^2$/g; most preferably less than 100 m$^2$/g;

b. $BET_{MICRO}$ of less than 100 m$^2$/g, preferably less than 60 m$^2$/g, more preferably less than 30 m$^2$/g;

c. Mean pore size above 40 nm, preferably above 50 nm, more, preferably above 60 nm and, in some cases, the mean pore size may be up to about 280 nm;

d. Modal pore size above 40 nm, preferably above 50 nm, more preferably above 60 nm and, in some cases, the modal pore size may be up to about 280 nm;

e. A ratio of modal pore size to mean pore size in the range from 0.2 to 1.1, preferably in the range from 0.4 to 1.05, more preferably in the range from 0.6 to 1;

f. Total pore volume greater than 0.5 cm$^3$/g, preferably greater than 0.7 cm$^3$/g, more preferably greater than 1.0 cm$^3$/g, for pores having a pore size in the range from 10 nm to 10,000 nm and, in some cases, the total pore volume may be up to 2.0 cm$^3$/g;

g. Particle diameter $d_{90}$ below 7 μm, preferably below 5 μm, more preferably below 3 μm and, in some cases, the particle diameter $d_{90}$ can be as low as 100 nm;

h. Less than 25 ppm impurities other than carbon, preferably less than 20 ppm, more preferably less than 18 ppm;

i. Fe content less than 25 ppm, preferably less than 20 ppm, more preferably less than 15 ppm; and j. Conductivity greater than 2 S/cm, preferably greater than 4 S/cm, more preferably greater than 6 S/cm.

In one aspect of this embodiment, it is preferred for one or more of the features a. b. d. f. g. h. i. and j. to be fulfilled.

In another aspect of this embodiment, it is preferred for at least features c. and d. to be fulfilled.

Porous carbon materials of this embodiment are particularly suitable for use in lithium ion cells, in particular, as a cathode additive. A contribution is made towards at least one of the above-mentioned objects by a lithium ion cell comprising the porous carbon material of the invention, preferably according to this embodiment.

In one embodiment, the porous carbon material has one or more, preferably all of the following features:

a. $BET_{TOTAL}$ of less than 100 m$^2$/g, preferably less than 8 m$^2$/g, more preferably less than 70 m$^2$/g, most preferably less than 60 m$^2$/g;

b. $BET_{MICRO}$ of less than 20 m$^2$g, preferably less than 15 m$^2$/g more preferably less than 10 m$^2$/g;

c. Mean pore size above 40 nm, preferably above 50 nm, more preferably above 60 nm and, in some cases, the mean pore size can be as high as 280 nm;

d. Modal pore size above 40 nm, preferably above 50 nm, more preferably above 60 nm and, in some cases, the modal pore size can be as high as 280 nm;

e. A ratio of modal pore size to mean pore size in the range from 0.2 to 1.1, preferably in the range from 0.4 to 1.05, more preferably in the range from 0.6 to 1;

f. Total pore volume greater than 0.5 cm$^3$/g, preferably greater than 0.8 cm$^3$/g, more preferably greater than 1.1 cm$^3$/g, for pores having a pore size in the range from 10 nm to 10,000 nm and, in some cases, the total pore volume may be up to 2.0 cm$^3$/g, Particle size ($d_{90}$) below 7 μm, preferably below 5 μm, more preferably below 3 μm and, in some cases, the particle size $d_{90}$ can be as low as 100 nm;

h. Less than 25 ppm impurities other than carbon, preferably less than 20 ppm, more preferably less than 18 ppm;

i. Fe content less than 25 ppm, preferably less than 20 ppm, more preferably less than 15 ppm; and j. Conductivity greater than 0.5 S/cm, preferably greater than 0.7 S/cm, more preferably greater than 1 S/cm.

In one aspect of this embodiment, it is preferred for one or more of the features a. b. d. f. g. h. i. and j. to be fulfilled.

In another aspect of this embodiment, it is preferred for at least features c. and d. to be fulfilled.

Porous carbon materials of this embodiment are particularly suitable for use in ion cells, in particular, as an anode additive. A contribution is made towards at least one of the above-mentioned objects by a lithium ion cell comprising the porous carbon material of the invention, preferably according to this embodiment.

In one embodiment, the porous carbon material has one or more, preferably all of the following features:

a. $BET_{TOTAL}$ greater than 200 m$^2$/g, preferably greater than 300 m$^2$/g, more preferably greater than 400 m$^2$/g and, in some cases, the $BET_{TOTAL}$ may be up to 1,000 m$^2$/g;

b. $BET_{MICRO}$ greater than 150 m$^2$/g, preferably greater than 200 m$^2$/g, more preferably greater than 250 m$^2$/g and, in some cases, the $BET_{MICRO}$ may be up to 1000 m$^2$/g;

c. Mean pore size above 40 nm, preferably above 50 nm, more preferably above 60 nm and, in some cases, the mean pore size can be as high as 280 nm;

d. Modal pore size above 40 nm, preferably above 50 nm, more preferably above 60 nm and, in some cases, the modal pore size can be as high as 280 nm;

e. A ratio of modal pore size to mean pore size in the range from 0.2 to 1.1. preferably in the range from 0.4 to 1.05, more preferably in the range from 0.6 to 1;

f. Total pore volume greater than 0.7 cm$^3$/g, preferably greater than 1.0 cm$^3$/g, more preferably greater than 1.3 cm³/g, for pores having a pore size in the range from 10 mu to 10,000 mu and, in some cases, the total pore volume may be up to 2.0 cm³/g;

g. Particle size ($d_{50}$) greater thin 25 μm, preferably greater than 30 μm, more preferably greater than 35 μm and, in some cases, the $d_{50}$ particle size may be up to about 200 μm;

h. Less than 4,000 ppm impurities other than carbon, preferably less than 2,500 ppm, more preferably less than 1,500 ppm;

i. Fe content less than 250 ppm, preferably less than 200 ppm, more preferably less than 150 ppm; and j. Conductivity greater than 0.1 S/cm, preferably greater than 0.2 S/cm, more preferably greater than 0.3 S/cm.

In one aspect of this embodiment, it is preferred for one or more of the features a. b. d. f g. h. i. and j. to be fulfilled.

In another aspect of this embodiment, it is preferred for at least features c. and d. to be fulfilled.

Porous carbon materials of this embodiment are particularly suitable for use in lead acid electrochemical cells. A contribution is made towards at least one of the above-mentioned objects by a lead acid electrochemical cell comprising the porous carbon material of the invention, preferably according to this embodiment.

In one embodiment, the porous carbon material has one or more, preferably all, of the following features:

a. $BET_{TOTAL}$ of greater than 400 m²/g, preferably greater than 450 m²/g more preferably greater than 500 m²/g and, in some cases, the $BET_{TOTAL}$ may be up to 2,000 m²/g;

b. $BET_{MICRO}$ greater than 200 m²/g, preferably greater than 250 m²/g, more preferably greater than 300 m²/g and, in some cases, the $BET_{MICRO}$ may be up to 1,000 m²g;

c. Mean pore size above 40 nm, preferably above 50 nm, more, preferably above 60 nm and, in some cases, the mean pore size may be up to about 280 nm;

d. Modal pore size above 40 nm, preferably above 50 nm, more preferably above 60 nm and, in some cases, the modal pore size may be up to about 280 nm;

e. A ratio of modal pore size to mean pore size in the range from 0.2 to 1.1, preferably in the range from 0.4 to 1.05, more preferably in the range from 0.6 to 1;

f. Total pore volume less than 1.2 cm²/g preferably less than 1 m²/g, more preferably less than 0.8 cm²/g, for pores having a pore size in the range from 10 nm to 10,000 nm:

g. Particle size $d_{90}$ below 7 μm, preferably below 5 μm, more preferably below 3 μm and, in some cases, the particle size $d_{90}$ can be as low as 100 nm;

h. Less than 25 ppm impurities other than carbon, preferably less than 20 ppm, more preferably less than 18 ppm;

i. Fe content less than 25 ppm, preferably less than 20 ppm, more preferably less than 15 ppm; and j. Conductivity greater than 2 S/cm, preferably greater than 6 S/cm, more preferably greater than 10 S/cm.

In one aspect of this embodiment, it is preferred for one or more of the features a. b. d. g. h. i. and j. to be fulfilled.

In another aspect of this embodiment, it is preferred for at least features c. and d. to be fulfilled.

Porous carbon materials of this embodiment are particularly suitable for use in electric capacitors, preferably electric double layer capacitors. A contribution is made towards at least one of the above-mentioned objects by a capacitor, preferably an electric double layer capacitor, comprising the porous carbon material of the invention, preferably according to this embodiment.

In one embodiment, the porous carbon material has one or more, preferably all, of the following features:

a. $BET_{TOTAL}$ of greater than 150 m²/g, preferably greater than 200 m²/g more preferably greater than 250 m²/g and, in some cases, the BETTOTAL may be up to 900 m²/g;

b. $BET_{MICRO}$ less than 200 m²/g, preferably less than 175 m²/g, more preferably less than 150 m²/g and, in some cases, the $BET_{MICRO}$ may be as low as 10 m²/g;

c. Mean pore size above 40 nm, preferably above 50 nm, more preferably above 60 nm and, in some cases, the mean pore size may be up to about 280 nm;

d. Modal pore size above 40 nm, preferably above 50 nm, more preferably above 60 nm and, in some cases, the modal pore size may be up to about 280 nm;

e. A ratio of modal pore size to mean pore size in the range from 0.2 to 1.1, preferably in the range from 0.4 to 1.05, more preferably in the range from 0.6 to 1;

f. Total pore volume more than 0.5 cm²/g, preferably more than 0.75 cm²/g, more preferably more than 1.0 cm²/g, for pores having a pore size in the range from 10 nm to 10,000 nm;

g. Particle size $d_{90}$ below 7 μm, preferably below 5 μm, more preferably below 3 μm and, in some cases, the particle size $d_{90}$ can be as low as 200 nm;

h. Less than 25 ppm impurities other than carbon, preferably less than 20 ppm, more preferably less than 18 ppm;

i. Fe content less than 25 ppm, preferably less than 20 ppm, more preferably less than 15 ppm; and j. Conductivity greater than 2 S/cm, preferably greater than 4 S/cm, more preferably greater than 5 S/cm.

In one aspect of this embodiment it is preferred for one or more of the features a. b. d. f. g. h. i. and j. to be fulfilled.

In another aspect of this embodiment, it is preferred for at least features c. and d. to be fulfilled.

Porous carbon materials of this embodiment are particularly suitable for use in electrochemical cells, preferably fuel cells, more preferably proton exchange membrane fuel cells. A contribution is made towards at least one of the above-mentioned objects by a fuel cell, preferably a proton exchange membrane fuel cell, comprising the porous carbon material of the invention, preferably according to this embodiment.

A further aspect of this disclosure relates to a porous carbon product having a specified distribution of particle size, preferably of particle diameter, preferably as determined by the test method presented herein. A preferred particle size, preferably particle diameter, is preferably a particle size of contiguous bodies.

A contribution towards overcoming at least one of the above-described technical objects is made by a porous carbon material |Y1| having a particle distribution $d_{50}$ in the range from 10 to 250 μm, preferably 20 to 220 μm, more preferably 25 to 200 μm, further more preferably 40 to 160 μm, still further more preferably in the range from 60 to 130 μm, most preferably in the range from 70 to 110 μm. In one embodiment, the porous carbon material has a particle size $d_{50}$ above 10 μm, preferably above 20 μm, more preferably above 25 μm, further more preferably above 40 μm, still further preferably above 50 μm, most preferably above 60 μm. In one embodiment, the porous carbon material has a particle size $d_{50}$ below 250 μm, preferably below 220 μm, more preferably below 200 μm, further more preferably below 160 μm, still further more preferably below 130 μm, most preferably below 110 μm. In some cases, the particle size $d_{50}$ may be up to about 280 μm. In one embodiment, it is preferred for the porous carbon material to satisfy one or more of the features described generally for porous carbon materials in this disclosure. In one embodiment, it is preferred for the porous carbon material to be obtainable, preferably obtained, by a process disclosed herein.

A contribution towards overcoming at least one of the above-described technical objects is made by a process |Y2| comprising the following steps:
  a. Providing a porous carbon material; and
  b. Adapting the particle distribution $d_{50}$ of the porous carbon material to a value in the range from 10 to 250 µm, preferably 20 to 220 µm, more preferably 25 to 200 µm, further more preferably 40 to 160 µm, still further more preferably in the range from 60 to 130 µm, most preferably in the range from 70 to 110 µm.

In one embodiment, the porous carbon material has a particle size $d_{50}$ above 10 µm preferably above 20 µm, more preferably above 25 µm, further more preferably above 40 µm, still further more preferably above 50 µm, most preferably above 60 µm. In one embodiment, the porous carbon material has a particle size $d_{50}$ below 250 µm, preferably below 220 µm, more preferably below 200 µm, further more preferably below 160 µm, still further more preferably below 130 µm, most preferably below 110 µm. In some cases, the particle size $d_{50}$ may be up to about 280 µm. In one embodiment, it is preferred for the porous carbon material to satisfy one or more of the features described generally for porous carbon materials in this disclosure. In one embodiment, it is preferred for the porous carbon material to be obtainable, preferably obtained, by a process disclosed herein.

A contribution towards overcoming at least one of the above-described technical objects is made by a device comprising the porous carbon material according to |Y1| or obtainable by the process according to |Y2|. A preferred device in this context is a cell, preferably a cell comprising lead or an acid or both. The porous carbon material is preferably employed in or at an electrode, preferably an anode. In one embodiment, the device comprises an acid. A preferred acid is sulfuric acid. In one embodiment, the device comprises water. In one embodiment, the device comprises $PbSO_4$. In one embodiment, the device comprises an electrolyte. Preferred constituents of the electrolyte are $H_2SO_4$ and $H_2O$. A preferred concentration of $H_2SO_4$ in the electrolyte is in the range from 1 to 1.5 $g/cm^3$, preferably in the range from 1.05 to 1.45 $g/cm^3$, more preferably in the range from 1.1 to 1.4 $g/cm^3$.

A contribution towards overcoming at least one of the above-described technical objects is made by a use of a porous carbon material according to |Y1| or obtainable by the process according to |Y2| in a device. A preferred device in this context is a cell, preferably a cell comprising lead or an acid or both. The porous carbon material is preferably employed in or at an electrode, preferably an anode. In one embodiment, the device comprises an acid. A preferred acid is sulfuric acid. In one embodiment, the device comprises water. In one embodiment, the device comprises $PbSO_4$. In one embodiment, the device comprises an electrolyte. Preferred constituents of the electrolyte are $H_2SO_4$ and $H_2O$. A preferred concentration of $H_2SO_4$ in the electrolyte is in the range from 1 to 1.5 $g/cm^3$, preferably in the range from 1.05 to 1.45 $g/cm^3$, more preferably in the range from 1.1 to 1.4 $g/cm^3$. The use is preferably for improving cell performance. In one aspect, the use is for reducing water loss. In one aspect the use is for increasing charge acceptance.

Test Methods

The following test methods are used in the invention. In the absence of a test method, the International Standards Organization (ISO) test method for the feature to be measured published most recently before the earliest filing date of the present application applies. In the absence of distinct measuring conditions, standard ambient temperature and pressure (SATP) as a temperature of 298.15 K (25 C, 77 F) and an absolute pressure of 100 kPa (14.504 psi, 0.986 atm) apply.

Skeletal Density (also Referred to as Material Density or Backbone Density)

The skeletal density measurements were performed according to DENT 66137-2. Between 0.49 g and 0.51 g of the powder sample were weighed in the sample cell and dried at 200° C. under vacuum for 1 hour prior to the measurement. The mass after drying was used for the calculation. A Pycnomatic ATC Helium Pycnometer from Themo Fisher Scientific, Inc. was used for the measurement, employing the "small" sample volume and the "small" reference volume. The pycnometer is calibrated monthly using the "extra small" sphere with a well-known volume of around 3 $cm^3$. Measurements were performed using Helium with a purity of 4.6, at a temperature of 20.00° C. and a gas pressure of approximately 2 bar, according to the DIN standard and the standard operating procedure (SOP) of the device.

Mercury Porosimetry (Pore Size and Pore Volume)

The specific pore volume for different pore sizes, the cumulative pore volume, and the porosity were measured by mercury porosimetry. The mercury porosimetry analysis was performed according to ISO15901-1 (2005). A Thermo Fisher Scientific PASCAL 140 (low pressure up to 4 bar) und a PASCAL 440 (high pressure up to 4,000 bar) and SOLID Version 1.6.3 (26 Nov. 2015) software (all from Thermo Fisher Scientific, Inc.) were calibrated with porous glass spheres with a modal pore diameter of 140.2 nm and pore volume of 924.4 $mm^3/g$ (ERM-FD122 Reference material from BAM). During measurements the pressure was increased or decreased continuously and controlled automatically by the instrument running in the PASCAL mode and speed set to 8 for intrusion and 9 for extrusion. The Washburn method was employed for the evaluation and the density of Hg was corrected for the actual temperature. The value for surface tension was 0.48 N/m and contact angle 140°. The sample size was between about 25 and 80 mg. Before starting a measurement, samples were heated to 150° C. in vacuum for 1 hour.

Gas Adsorption (Total, External and Micropore Specific Surface Area, $BET_{total}$, $BET_{external}$ and $BET_{micro}$)

BET measurements to determine the specific surface area of particles were made in accordance with DIN ISO 9277: 2010. A NOVA 3000 (from Quantachrome) Which works according to the SMART method (Sorption Method with Adaptive dosing Rate), was used for the measurement. As reference material Quantachrome Alumina SARM Catalog No. 2001 (13.92 $m^2/g$ on multi-point BET method), and SARM Catalog No. 2004 (214.15 $m^2/g$ on multi-point BET method) available from Quantachrome were used. Filler rods were added to the reference and sample cuvettes in order to reduce the dead volume. The cuvettes were mounted on the BET apparatus. The saturation vapour pressure of nitrogen gas (N2 4.0) was determined. A sample was weighed into a glass cuvette in such an amount that the cuvette with the filler rods was completely filled and a minimum of dead volume was created. The sample was kept at 200° C. for 1 hour under vacuum in order to dry it. After cooling the weight of the sample was recorded. The glass cuvette containing the sample was mounted on the measuring apparatus. To degas the sample, it was evacuated at a pumping speed selected so that no material was sucked into the pump to a final pressure of 10 mbar.

The mass of the sample after degassing was used for the calculation. For data analysis the NovaWin 11.04 Software was used. A multi-point analysis with 5 measuring points was performed and the resulting total specific surface area ($BET_{total}$) given in m$^2$/g. The dead volume of each sample cell was determined once prior to the measurement using Helium gas (He 4.6, humidity 30 ppmw). The glass cuvettes were cooled to 77° K using a liquid nitrogen bath. For the adsorptive, N$_2$ 4.0 with a molecular cross-sectional area of 0.162 nm$^2$ at 77° K was used for the calculation.

The empirical t-plot methodology was used according to ISO15901-3:2007 to discriminate between contributions from micropores and remaining porosity at relative pressures of more than 0.1 (i.e., mesoporosity, macroporosity and external surface area contributions) and to calculate the micropore surface ($BET_{micro}$) and micropore volume. The low-pressure isotherm data points up to a cut-off p/po, typically up to 0.1 p/po, were selected to determine the linear section of the t-plot. Data point selection was validated by obtaining a positive C constant. The micropore volume was determined from the ordinate intercept. The micropore specific surface area ($BET_{micro}$) can be calculated from the slope of the t-plot.

The external specific surface area $BET_{external}$ is defined by subtracting the micropore specific surface area from the total specific surface area, $BET_{external} = BET_{total} - BET_{micro}$.

Particle Size Distribution

Laser Diffraction ($D_{10}$, $D_{50}$, $D_{90}$):

For particle size determination of the particles a laser diffraction method was used according to ISO Standard 13320. A Mastersizer 3000 from Malvern equipped with a He—Ne Laser (wave length of 632.8 nm with a maximum power of 4 MW) and a blue LED (wave length of 470 nm with a maximum power of 10 mW) and wet dispersing unit (Hydro MV) was employed for the measurements performed at ambient temperature of 23° C. A mixture of isopropanol and deionized water (50%/50%) was used as a measurement medium. The mixture was degassed in the dispersing unit by using the built-in stirrer at 3,500 rpm and ultrasonicated at maximum power for 10 seconds. The sample material was prepared as a concentrated dispersion in 100% isopropanol (40 mL). The quantity of material was, sufficient to create a homogeneous mixture after the ultrasonic finger mixing for 30 seconds. The sample was added to the dispersing unit drop-wise with a pipette until the obscuration value was between 3-7%. The values of $D_{10}$, $D_{50}$ and $D_{90}$ (volume based) were determined using the Malvern software Mastersizer 3000 Software 3.30, and a form factor of 1. The Fraunhofer theory was used for samples where the particles were >10 μm and the Mie theory was applied to materials where the particles were <10 μm.

Sieving (Weight Fraction having Particle Size of more than 315 μm):

Sieving for weight fractions with particles having a size larger than 315 μm was. performed carefully with a sieve with an Air Jet RHEWLIM LPS 200 MC sieving machine (RHEWUM GmbH) equipped with a sieve with 315 μm openings from Haver mid Böcker (HAVER & BOECKER OHG).

Dispersability of Amphiphilic Molecule in Water

Samples of 0.5 g of amphiphilic molecule and 10 mL of deionized water were introduced into a 20 mL glass container with a screw top lid. The closed container was vigorously shaken for 25 seconds. This 25-second shaking was repeated 10 further times separated by 10-minute intervals. After a 1-day interval, the closed container was again vigorously shaken for 25 seconds and the 25-second shaking was repeated 10 further times separated by 10-minute intervals. The container was inspected visually immediately after the final shaking. The dispersability was characterized by the following three features:

a. whether gas bubbles were present, b. whether one non-gas phase was or more than one non-gas phases ware present, and c. where a single non-gas phase was present, whether the phase was milky or clear.

Clear in this context preferably means producing an obscuration of less than 0.1% according to the method given herein. The container was also inspected after the following periods of time following the final shaking: 5 minutes, 10 minutes, one hour and one day. In each, further, inspection, the dispersibility was characterized according to features b. and c.

Gas bubbles can be present within the body of another phase or may accumulate at the top of another phase to form a foam.

Powder Conductivity

The powder test sample was compacted using uniaxial mechanical pressing with a pressure of 75 kg/cm$^2$. Au electrical current was applied to the compacted test sample using gold-plated electrodes and the potential difference across the voltage drop measured. From this measurement the electrical resistance and thus the conductivity in Skin were calculated. A value of more than 1 S/cm is classed as being electrically conductive.

Obscuration Determination for Solution Clarity

The clarity of a solution was determined by laser obscuration using the Malvern Mastersizer 3000 instilment equipped with a He—Ne Laser (632.8 nm wavelength) and a blue LED and wet dispersing unit (Hydro MV) and measurements were performed at ambient temperature of 23° C. A mixture containing 5 g of amphiphilic molecule in 100 mL of deionized water was introduced into a 250 mL glass container with a screw top lid. The Hydro MV dispersing unit was automatically filled with deionized water by the Malvern software Mastersizer 3000 Software 3.30 and the background measurement was measured. The built-in stirrer was set at 500 rpm and the solution was continuously stirred. An aliquot of 5 mL was pipetted out of the 100 mL water/5 g amphiphilic molecule solution and added to the Hydro MV dispersing unit. The unit was stirred at 500 rpm for 2 minutes. Three measurements were taken, each of 10 seconds, and the average obscuration of the He—Ne laser was determined for each measurement by the software and reported as a percent. The path length of light through the sample was 2.6 mm. An obscuration $(I_0-I)/I_0$ of less than 0.1% is considered to be clear.

Ethylene Oxide Content Determination in Polyols by NMR

The determination of the ethylene oxide (EU) content was determined using the ASTM standard test method (D4875-05). The test method B with carbon-13 nuclear mamietic resonance spectroscopy ($^{13}$C NMR) was used. A Barker AC 300 spectrometer was used with deuterated acetone (NMR-grade with tetramethylsilane (TMS) as the internal standard) and NMR sample tubes with a diameter of 5 mm. Samples were prepared with 3 mL of amphiphilic molecules with 2 mL of deuterated acetone, and mixtures were vigorously shaken for 25 seconds. The shaking was repeated 10 times at 10-minute intervals. The appropriate sample amount was transferred to an NMR tube.

The spectrometer parameters were set as in the ASTM method with the lock on acetone d-6, pulse angle 90°, acquisition time of 2 seconds, pulse delay of 5 seconds, spectral width of 100 ppm, and 32k data point acquisition and the H-1 decoupler on. The signal was acquired with 2,000 transients and Fourier transformed from a weighted free induction decay signal to the frequency domain spectrum. The integrated areas of the PO (propylene oxide) methane and methylene carbon peaks (from 76.6 to 72.8 and 67.0 to 65.2 ppm (TMS reference)) and the EO carbon resonances (from 72.6 to 68.3 and 62.0 to 61.0 ppm) were obtained. For EO-capped polyols, the resonance at 73.1 ppm corresponds to the beta carbon of the terminal EO block and was subtracted from the PO peak area and added to the EO peak area. The PO and EO ratio was obtained by:

$$PO/EO = \frac{B' + C' - F}{B + C + F}$$

Where:
B'=area of the PO resonances.
B=area of the EO carbons,
C'=area of PO terminal methane carbon,
C=total area of terminal EO carbons, and
F=area of terminal EO carbon of an EO block.
(Areas C and F are Only Significant for EO-Cappedpolyols)

The weight percent of EO was calculated from the PO/EO ratio (calculated above) by:

$$EO = \frac{44}{58(PO/EO) + 44} \times 100$$

Where the molecular mass for EO is 41 g/mol EO and for PO is 58 g/mol PO. The EO percent was reported to the nearest tenth percent.

Adjacent Ethylene Oxide Unit Determination by Coupled LC and MALM-TOF MS

The method of S. M. Weidner et al. (Rapid Commun. Mass Spectrom. 2007; 21: 2,750-58) was employed. The ions were detected with a micro-channel plate (MCP) detector. The mass spectrum was analyzed to determine the presence of spectral features separated by 44 m/z units which correspond to adjacent EO units.

Determination of Effective HLB Value of Amphiphilic Molecules—Reference Method

An Effective HLB value was determined from the stability determination of an oil and water emulsion made with various blends of two surfactants. The emulsion was made with a canola oil [CAS 120962-03-0] and deionized water. If the unblended surfactant to be tested made a two-phase dispersion or a non-clear dispersion in the water dispersability test immediately after shaking, it was considered a low HLB value dispersant and was blended with Tween® 20 (HLB value from Griffin Method of 16.7 and available from Croda GmbH, [CAS 9005-64-5]). If the surfactant to be tested made a single non-gas-phase dispersion with a clear phase in the water dispersability test, it was considered a high HLB value dispersant and was blended with Span® 80 (HLB value from Griffin Method of 4.3 and available from Croda GmbH, [CAS 1338-43-8]).

| Blend number | Low HLB value surfactants | High HLB value surfactants |
|---|---|---|
| 1 | 100 wt. % surfactant to be tested/0 wt. % Tween 20 | 100 wt. % Span 80/0 wt. % surfactant to be tested |
| 2 | 90 wt. % surfactant to be tested/10 wt. % Tween 20 | 90 wt. % Span 80/10 wt. % surfactant to be tested |
| 3 | 80 wt. % surfactant to be tested/20 wt. % Tween 20 | 80 wt. % Span 80/20 wt. % surfactant to be tested |
| 4 | 70 wt. % surfactant to be tested/30 wt. % Tween 20 | 70 wt. % Span 80/30 wt. % surfactant to be tested |
| 5 | 60 wt. % surfactant to be tested/40 wt. % Tween 20 | 60 wt. % Span 80/40 wt. % surfactant to be tested |
| 6 | 50 wt. % surfactant to be tested/50 wt. % Tween 20 | 50 wt. % Span 80/50 wt. % surfactant to be tested |
| 7 | 40 wt. % surfactant to be tested/60 wt. % Tween 20 | 40 wt. % Span 80/60 wt. % surfactant to be tested |
| 8 | 30 wt. % surfactant to be tested/70 wt. % Tween 20 | 30 wt. % Span 80/70 wt. % surfactant to be tested |
| 9 | 20 wt. % surfactant to be tested/80 wt. % Tween 20 | 20 wt. % Span 80/80 wt. % surfactant to be tested |
| 10 | 10 wt. % surfactant to be tested/90 wt. % Tween 20 | 10 wt. % Span 80/90 wt. % surfactant to be tested |
| 11 | 0 wt. % surfactant to be tested/100 wt. % Tween 20 | 0 wt. % Span 80/100 wt. % surfactant to be tested |

The emulsions each made with 10 mL of oil and 10 mL of deionized water were added to a glass vial with a screw top lid. In each case, a 1 g sample of the blend of surfactants was added to the oil and water mixture. The dosed vial containing the mixture was vigorously shaken for 25 seconds. The 25-second shaking was repeated 10 times at 10-minute intervals. After a 1-day interval the closed vial was again vigorously shaken for 25 seconds and the 25-second shaking was repeated 10 further times separated by 10-minute intervals. The stability of the emulsions was characterized by the height of the water component in the dispersions as measured with a ruler in centimeters. The stability was measured after 7 days from the last shaking. The two blends which produced the water component with the smallest height were identified. Further blends at 2.5 wt. % increments were made and tested in the range between the two identified blends. The blend which yielded the smallest height of the water component matches the required HLB of canola oil of 7. The effective HLB can be calculated from the weight ratio in the blend and the known HLB of the Span® 80 or Tween® 20 in the blend assuming the blend has a combined HLB of 7.

Transport of Solvent in an Electrode

Ethanol was added to the carbon material powder to be tested until a homogeneous wetted mass was obtained (typical ratio of carbon:ethanol of 1:3 by weight). A suspension of 60 wt. % of PTFE in water (purchased from Sigma Aldrich GmbH, CAS: 9002-84-0) was employed as a binder. A minimum amount of binder was employed sufficient for forming a. dough-like mass later (typically binder in the range 5-30% wt. % was required with respect to the carbon in the mixture). While mixing for one hour, the slurry transformed into a dough-like mass. The moist electrode was rolled out with a rolling pin to a layer thick mess of 250 μm when wet, and dried for 12 hours at 120° C. If the dried electrode exhibited cracking, the test procedure was restarted employing a higher content of binder.

An 8 mm×15 mm rectangle sample from the prepared dried electrode sheet was cut. A clip sample holder (SH0601 sample holder from Krüss GmbH) was used to hang the electrode. sample. A force tensiometer K100 from Krüss GmbH was used in the contact angle measurement mode and using a glass vessel (SV20 from Krüss GmbH, diameter of 70 mm) containing 2-propanol CAS number 67-63-0). The measurement was controlled by the Krüss Laboratory Desktop software, Version 3.2.2.3068, provided by Krüss GmbH and performed at ambient temperature of 23° C. The sample was suspended above the solvent which was raised at a 6 mm/min rate to detect the surface of the liquid (sensitivity for detection was 0.01 g). The electrode sample was further dipped in the solvent by raising the solvent vessel at a rate of 3 mm/min. If the electrode bent or curled during the dipping procedure, the test was restarted with a new electrode sample. The mass was recorded every 0.2 m from a depth of 1 mm to a final depth of 6 mm. The electrode sample was held at 6 mm depth for 45 seconds, after which the mass was again recorded. The electrode was removed from the solvent at a rate of 3 mm/min with data measurements every 0.2 mm. The mass of the absorbed solvent during the 45-seconds hold at 6 mm was determined by subtraction. The measurement was repeated three times and the average solvent uptake mass was determined. The absorbed solvent mass is directly related to the transport efficiency in the electrode.

DESCRIPTION OF THE FIGURES

FIG. 1 shows a process 100 for preparing a porous carbon material 106. A carbon source 101, in this case a novolac-type resoreinol/formaldehyde resin (Askofen 779 W 50), dispersed in water (50% resin content); an amphiphilic species 102, in this case Synperonic PEIF127 (non-ionic high FMB emulsifier); and other constituents 103, in this case no other constituents and in particular no cross-linking agent, were contacted in a contacting step 104 thereby obtaining a precursor 105. A heating step 106 is performed to obtain a porous carbon material 107 from the precursor 105.

Figure 2:
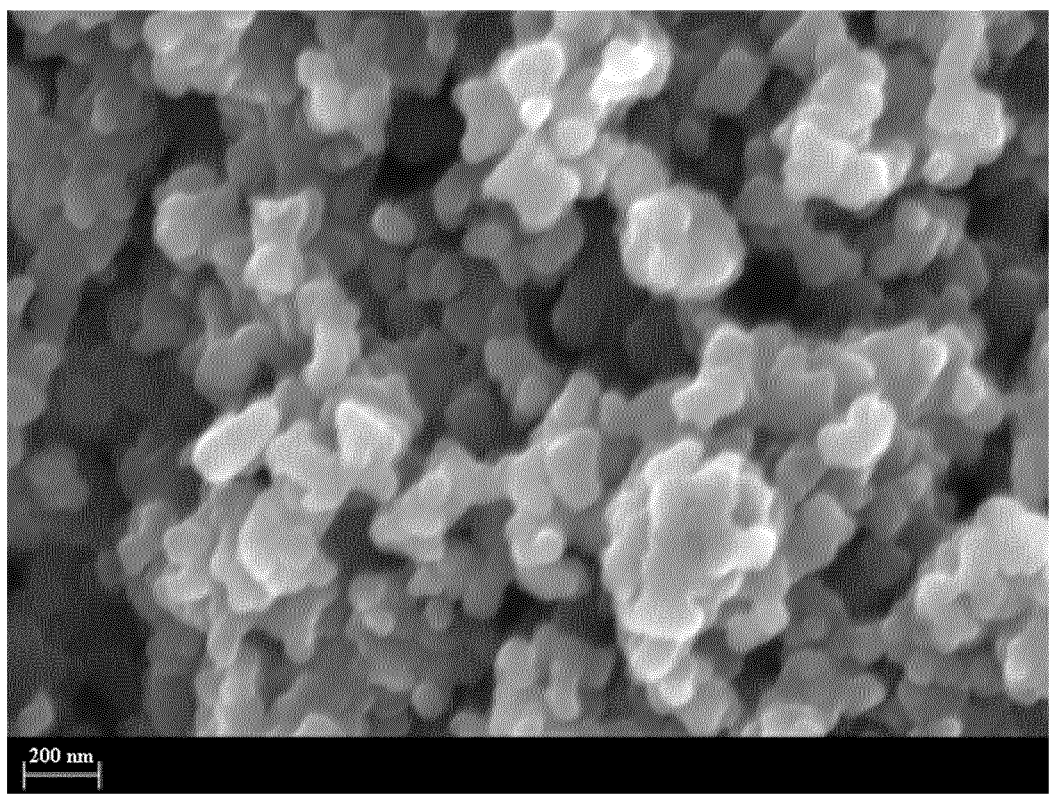
FIG. 2 shows an SEM image of the surface of a material prepared according to the invention.

FIG. 2 shows an SEM image of the surface of a material prepared according to the invention using Askofen 779 W 50 and Genapol PF20 as starting materials. It can be seen that the carbon structure is formed of interconnected beads with hollow pores in between.

Figure 3:
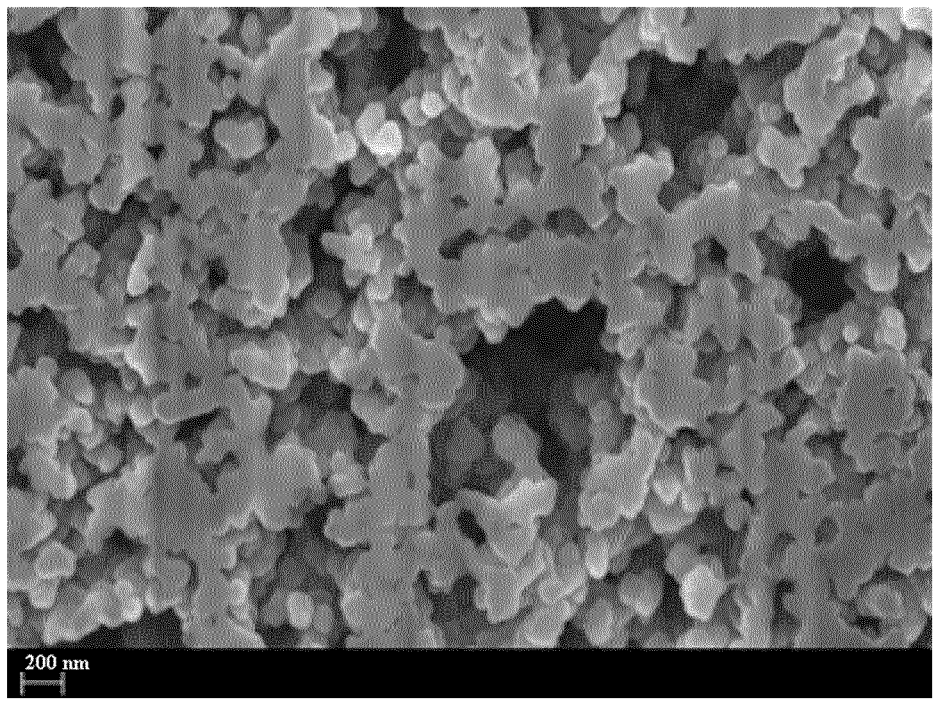
FIG. 3 shows an SEM image of the surface of a cross-sectional cut through a material prepared according to the invention.

FIG. 3 shows an SEM image of the surface of a cross-sectional cut through a material prepared according to the invention using Askofen 779 W 50 and Genapol. PF20 as starting materials. Here also the bead structure and pores of the carbon body are evident.

Figure 4:
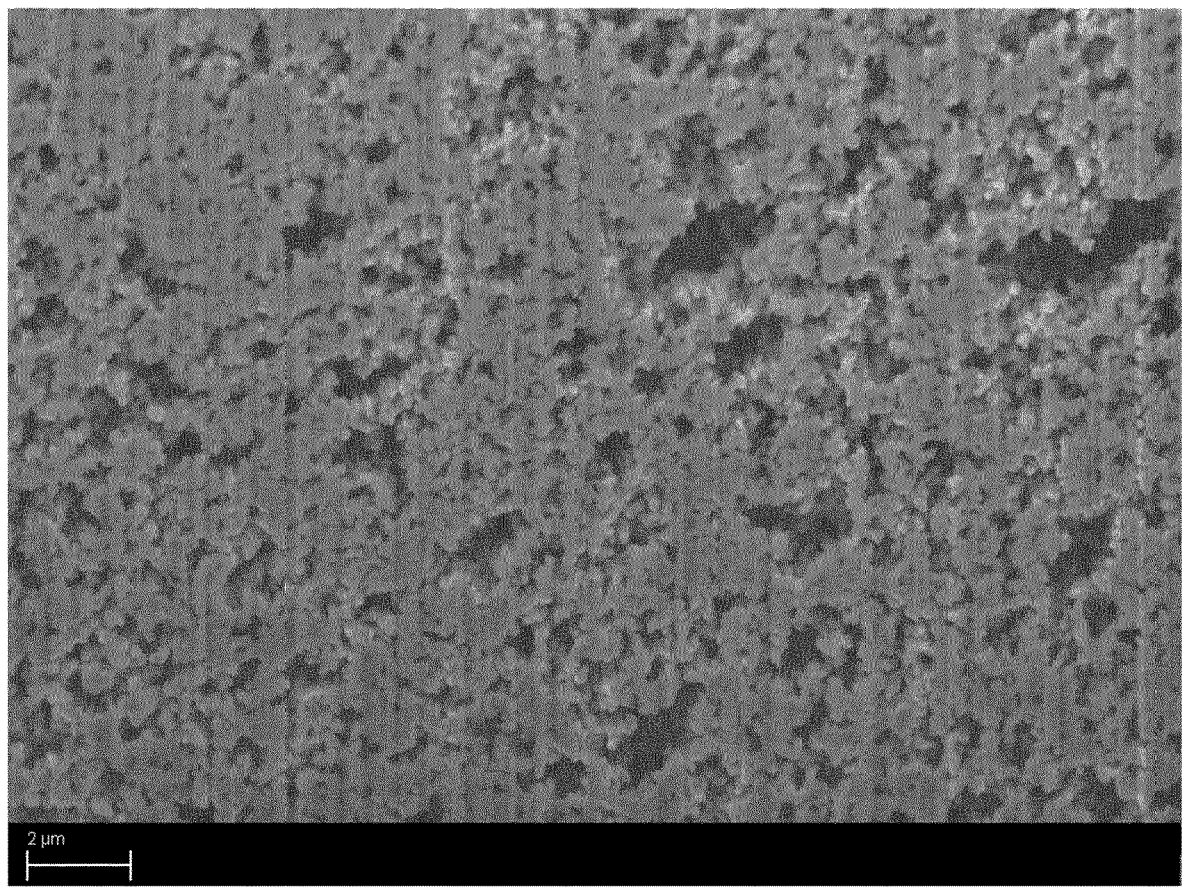
FIG. 4 shows an SEM image of the surface of a cross-sectional cut through a material prepared according to the invention.

FIG. 4 shows an SEM image of the surface of a cross-sectional cut through a material prepared according to the invention using Askofen 779 W 50 and Genapol PF20 as starting materials and is the same cut as in FIG. 3 zoomed out. The long-range homogeneity of the carbon structure is seen in this figure.

Figure 5:
FIG. 5 shows an SEM image of the surface of a cross-sectional cut through a material prepared according to the invention.

FIG. 5 shows an SEM image of the surface of the material prepared according to the invention using Askofen 779 W 50 and Genapol PF20 as starting materials. The porosity in the material is evident even at low magnification.

Figure 6:
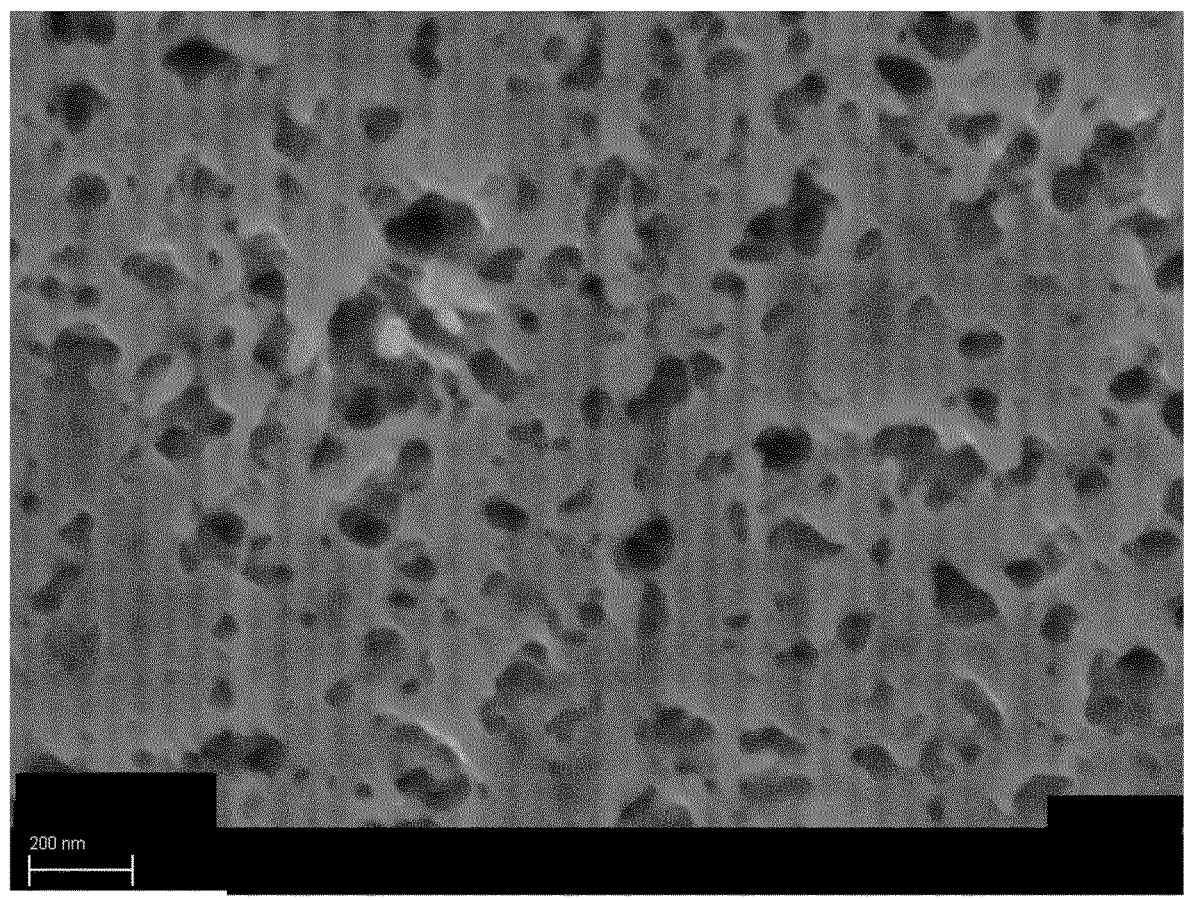
FIG. 6 shows a graph of pore size in a material prepared according to the invention.

FIG. 6 shows an SEM image of the surface of a cross-sectional cut through a material prepared according to the invention using Alnovol PN320 Past and Genapol PF20 as starting materials. Here also the interconnected pores of the carbon body are evident.

Figure 7:
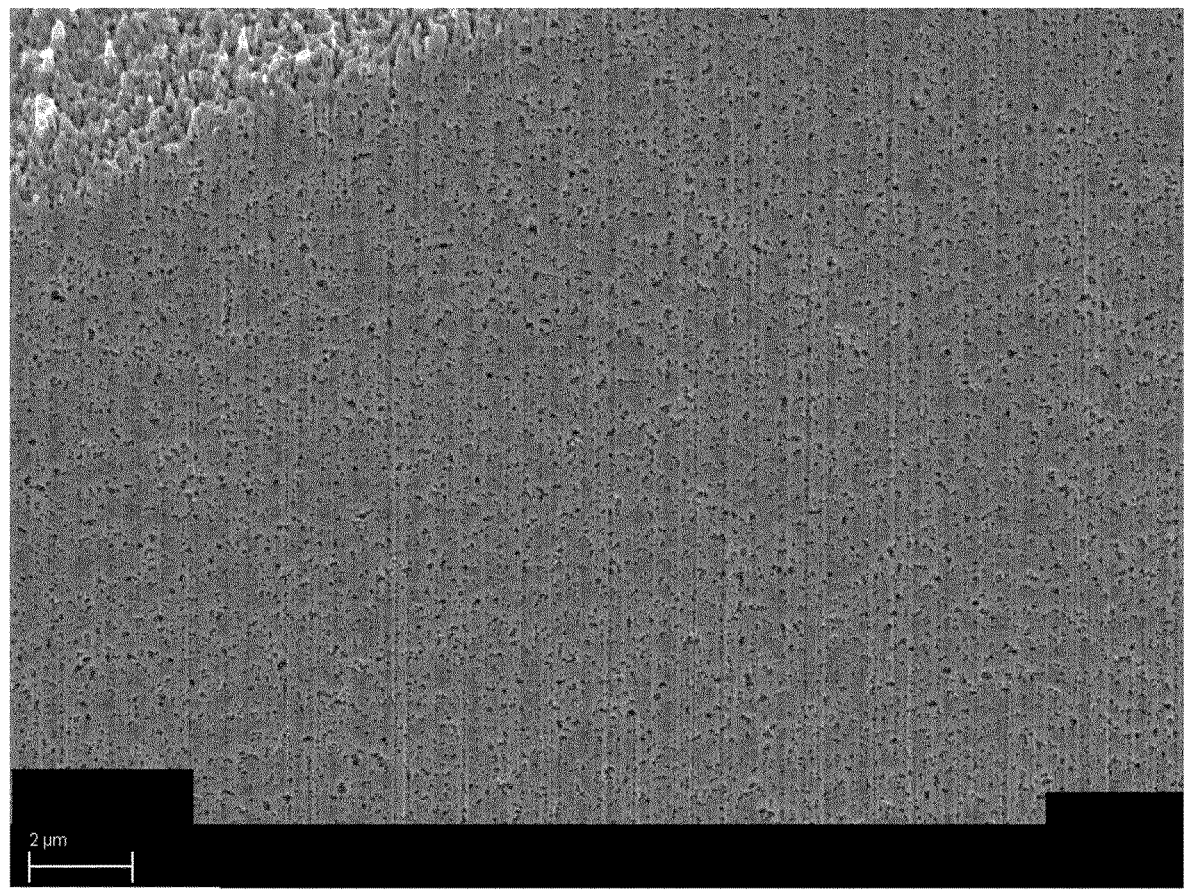
FIG. 7 shows an SEM image of the surface of a cross-sectional cut through a material prepared according to the invention.

FIG. 7 shows an SEM image of the surface of a cross-sectional cut through a material prepared according to the invention using Alnovol PN320 Past and Genapol PF20 as starting materials and is the same cut as in FIG. 6 zoomed out. The long-range homogeneity of the carbon structure is seen in this figure.

Figure 8:
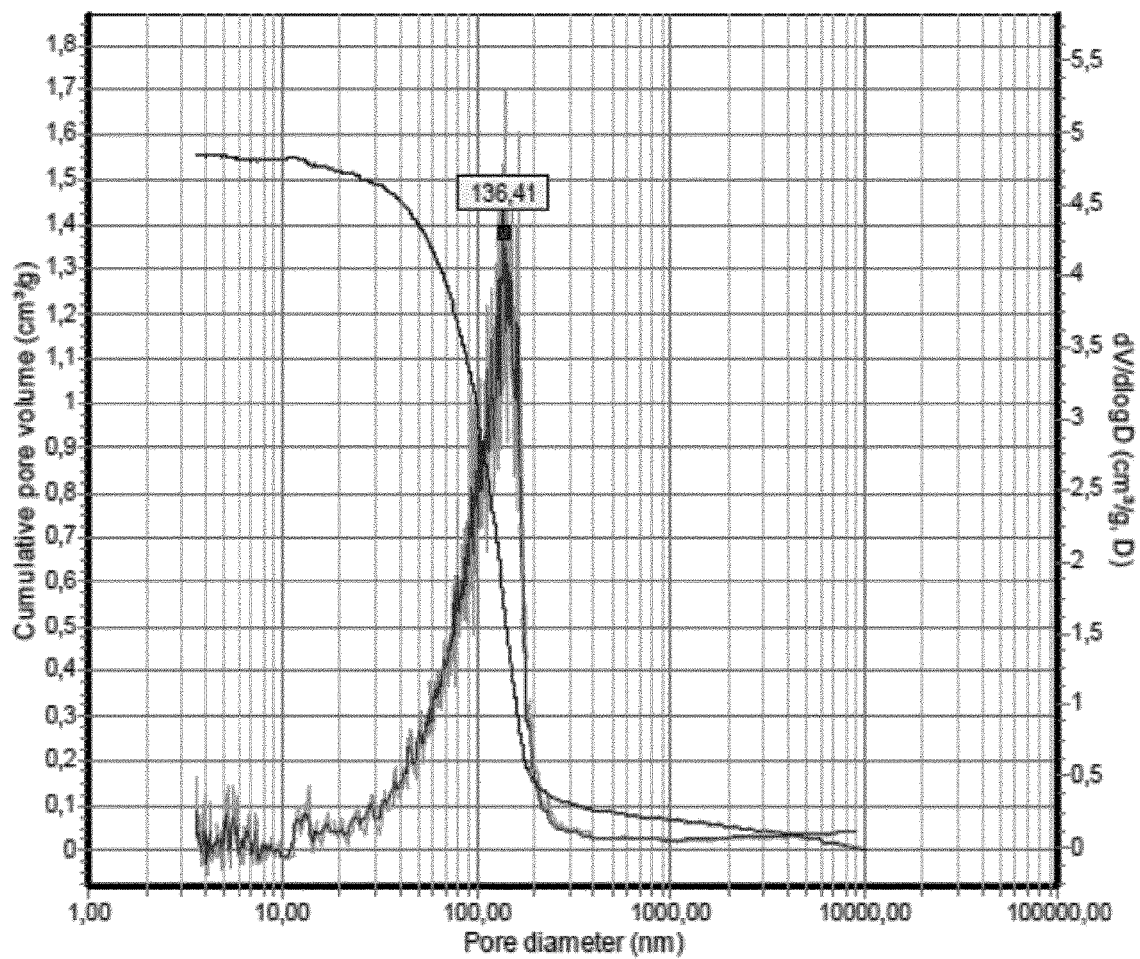
FIG. 8 shows a graph of pore size distribution u a material prepared according to the invention.

FIG. 8 shows a graph of pore size distribution in a material prepared according to the invention with Askofen 779 W 50 and Genapol PF20 as starting materials. Mode in the pore size can be seen at 136 BM.

Figure 9:
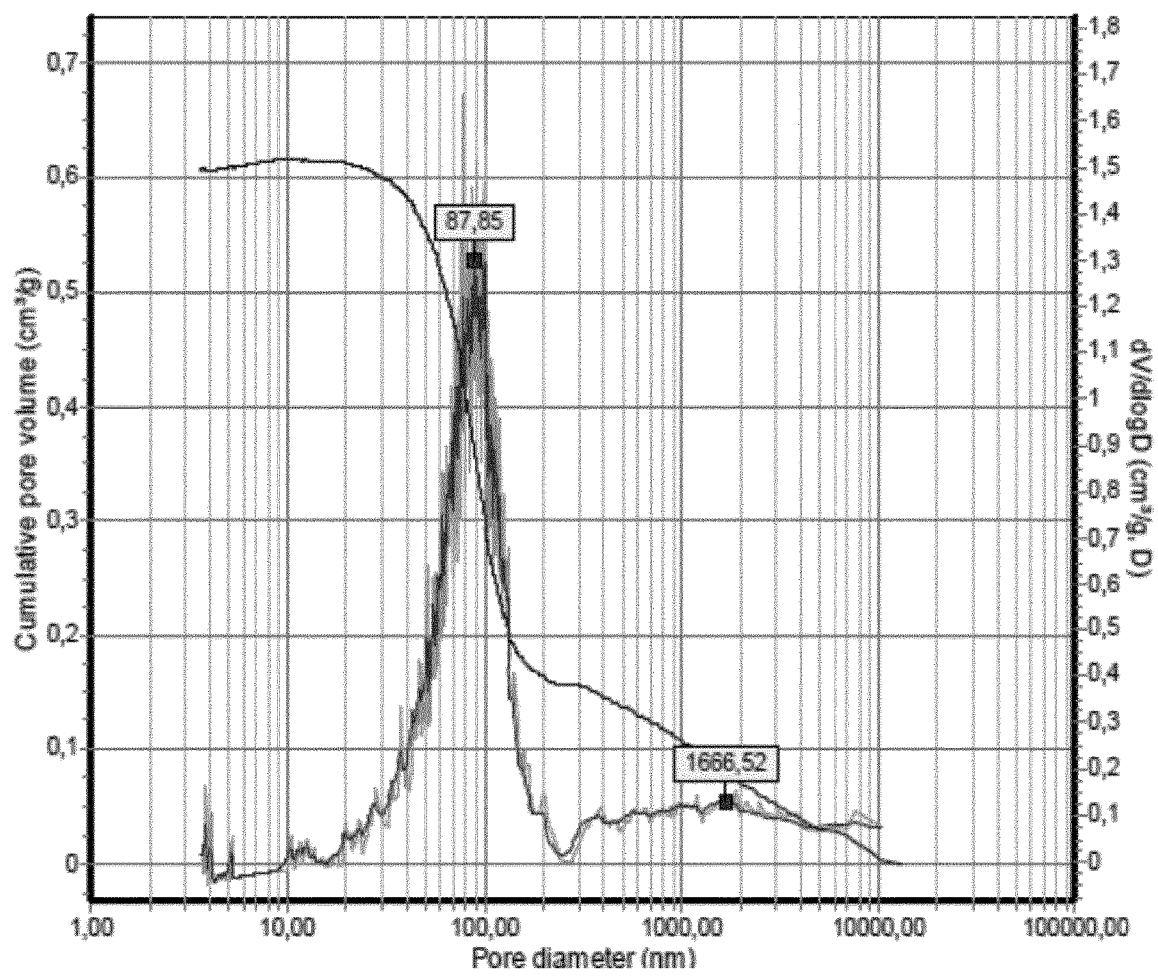
FIG. 9 shows a graph of the pore size distribution in a material prepared according to the invention.

FIG. 9 shows a graph of the pore size distribution in a material prepared according to the invention with Alnovol PN320 Past and Genapol PF20 as starting materials. Mode in the pore size can be seen at 87.9 nm.

Figure 10:
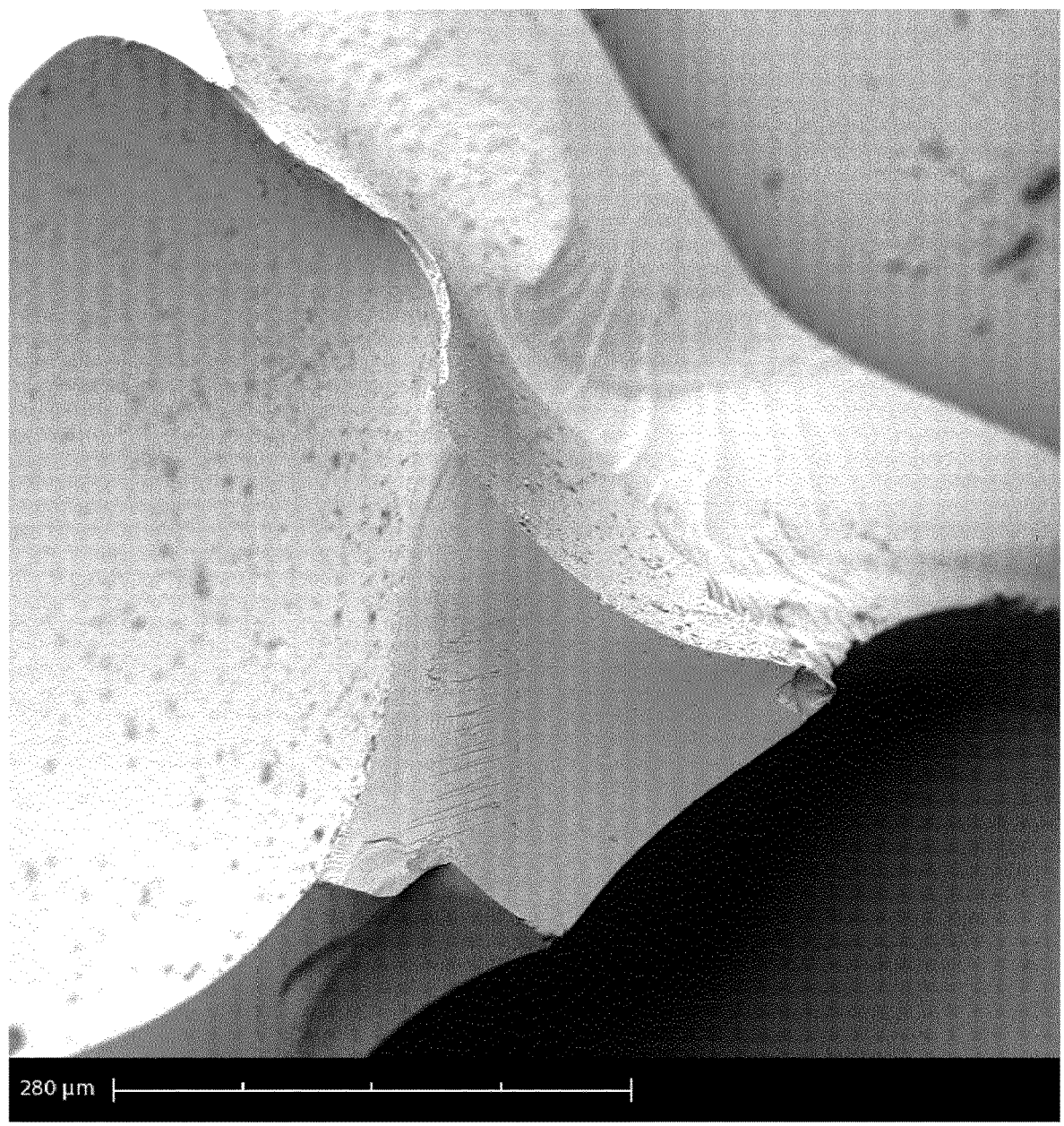
FIG. 10 shows an SEM image of the surface of a material prepared according to a comparative example.

FIG. 10 shows an SEM image of the surface of a material prepared according to a comparative example using Askofen 295 E 60 (reseal resin) and Pluronic® P123 as starting materials. It can be seen that no long-range porous structure in the carbon is formed.

Figure 11:
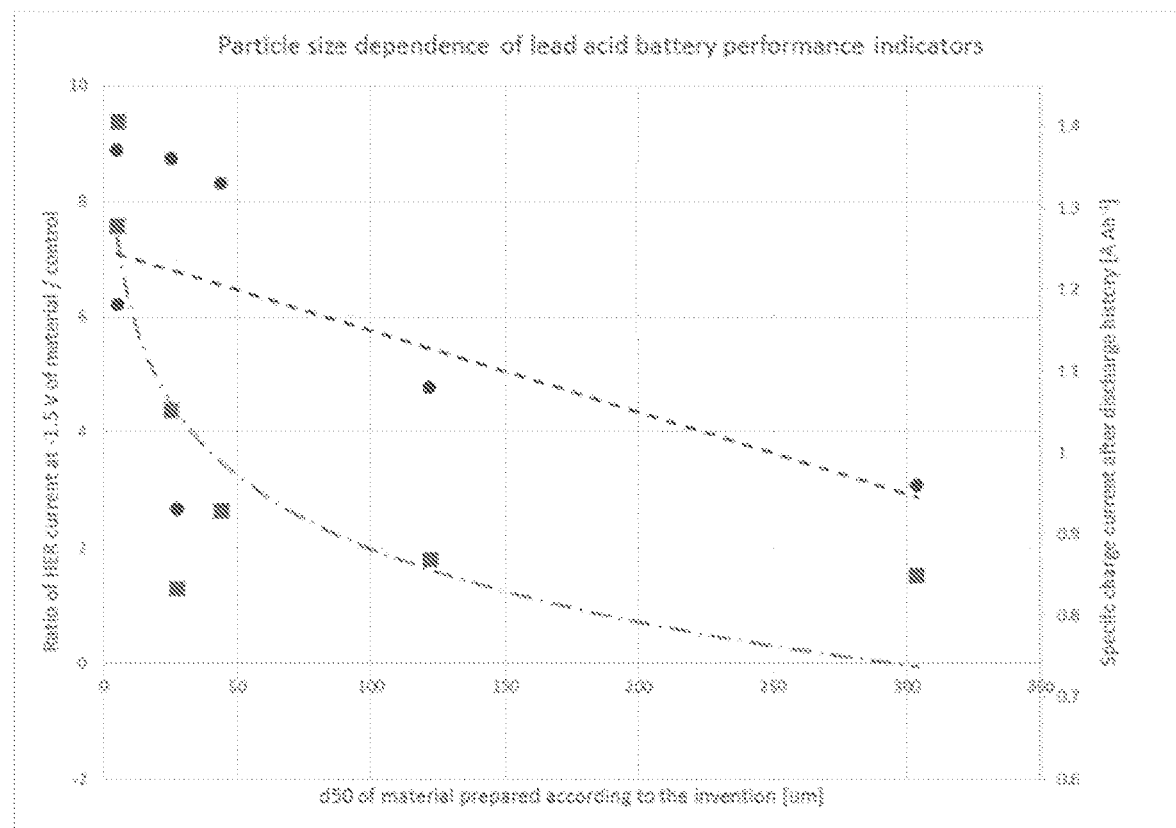
FIG. 11 shows electrochemical performance in lead acid batteries as a function of particle size in materials prepared according to the invention.

FIG. 11 shows the particle size dependence of the ratio of the hydrogen evolution current at −1.5 V for a material prepared according to the invention and a control carbon black (shown on the left axis and with square data points) and the dynamic charge acceptance (DCA) (after discharge) (shown on the right axis and with circular data points) of a material prepared according to the invention. Data points are taken from Table 6. An exponential trend line is shown for the ratio of hydrogen evolution current versus particle size (shown with alternating dashes and dots), and a linear trend line is shown for the DCA versus particle size (shown as a uniform dashed line).

EXAMPLES

The invention is now further elucidated with the aid of examples. These examples are for illustrative purposes and are not to be considered as limiting the scope of the invention. Commercial sources for materials employed are presented in Table 0 below.

Example 1

Askofen 779 W 50 (an aqueous red liquid with a solid content of 50% of a novolac-type resin of resorcinol-formaldehyde), commercially available from ASK Chemicals GmbH, and an amphiphilic species were introduced into a reaction vessel in proportions as indicated in Table 1. The reaction vessel and contents were without mixing or standing time heated to 900° C. and maintained at that temperature for 3 hours. The properties of the resulting porous carbon material are also shown in Table 1.

Example 2

Example 1 was performed but with a mixture of Alnovol PN 320 (yellow pellets or flakes of a novolac-type resin of phenol-formaldehyde), commercially available from Annex, Germany GmbH, in place of Askofen 779 W 50 and an amphiphilic species were introduced into a reaction vessel in proportions as indicated in Table 2. The reaction vessel and contents were without mixing or standing time heated to 900° C. and maintained at that temperature for 3 hours. Porous materials were successfully obtained, including macro-porous materials.

Example 3

Example 1 was performed but with a mixture of Penacolite R2170 (an aqueous red liquid with a solid content of 75% of a novolac-type resin of resorcinol-formaldehyde), commercially available from Sumitomo Corporation, in place of Askofen 779 W 50 and an amphiphilic species were introduced into a reaction vessel in proportions as indicated in Table 3. The reaction vessel and contents were without mixing or standing time heated to 900° C. and maintained at that temperature for 3 hours. Porous materials were successfully obtained, including macro-porous materials.

Example 4

Example 1 was performed but with a mixture of Penacolite R2170 (an aqueous red liquid with a solid content of 75% of a novolac-type resin of resorcinol-formaldehyde), commercially available from Sumitomo Corporation, alone or in addition to Askofen 779 W 50, hexamethylenetetramine (HMTA) as a cross-linker and an amphiphilic species were introduced into a reaction vessel in proportions as indicated in Table 3. The reaction vessel and contents were without mixing or standing time heated to 900° C. and maintained at that temperature for 3 hours. Porous materials were successfully obtained, including macro-porous materials.

Comparative Example 1

Example 1 was performed but with a mixture of Askofen 295 E 60 (an organic red liquid with a solid content of 60% of a phenol resol-type resin), commercially available from ASK Chemicals GmbH, in place of Askofen 779 W 50 and an amphiphilic species were introduced into a reaction vessel in proportions as indicated in Table 4. The reaction vessel and contents were without mixing or standing time heated to 900° C. and maintained at that temperature for 3 hours. Porous materials were not successfully obtained.

Comparative Example 2

Example 1 was performed but with a mixture of Askofen 295 E 60 (an organic red liquid with a solid content of 60% of a phenol resol-type resin), commercially available from ASK Chemicals GmbH, in place of Askofen 779 W 50 in combination with Penacohte R2170 novolac-resin and an amphiphilic species were introduced into a reaction vessel in proportions as indicated in Table 3. The reaction vessel and contents were without mixing or standing time heated to 900° C. and maintained at that temperature for 3 hours. Porous materials, were not successfully obtained.

Carbon Black Material (Comparative)

Hydrogen evolution tests and dynamic charge acceptance tests in a lead acid battery were performed using Lamp Black 101 (LB 101) carbon black, available from Orion Engineered Carbons. The carbon black had a $d_{50}$ of 95 nm and a BET (NSA) value of 29 $m^2/g$. Results are shown in Table 6.

TABLE 0

| Manufacturer | Product name | Material type |
| --- | --- | --- |
| Croda GmbH | Synperonic ™ PE/F127 | Amphiphilic molecule |
| Croda GmbH | Synperonic ™ PE/P84 | Amphiphilic molecule |
| Croda GmbH | Synperonic ™ PE/P105 | Amphiphilic molecule |
| Croda GmbH | Synperonic ™ PE/L62 | Amphiphilic molecule |
| Clariant International LTD | Genapol ® PF10 | Amphiphilic molecule |
| Clariant International LTD | Genapol ® PF20 | Amphiphilic molecule |
| Clariant International LTD | Genapol ® X-080 | Amphiphilic molecule |
| Clariant International LTD | Genapol ® X-100 | Amphiphilic molecule |
| BASF SE (purcinased from Sigina Aldrich GmbH) | Pluronic ® F-68 | Amphiphilic molecule |
| BASF SE (purchased from Sigma Aldrich GmbH) | Pluronic ® 10R5 | Amphiphilic molecule |
| BASF SE (purchased from Sigma Aldrich GmbH) | Pluronic ® L-31 | Amphiphilic molecule |
| BASF SE: (purchased from Sigma Aldrich GmbH) | Pluronic ® L-35 | Amphiphilic molecule |
| BASF SE (purchased from Sigma Aldrich GmbH) | Pluronic ® P123 | Amphiphilic molecule |
| BASF SE (purchased from Sigma Aldrich GmbH) | Pluronic ® L121 | Amphiphilic molecule |
| BASF SE (purchased from Sigma Aldrich GmbH) | Pluronic ® 31R1 | Amphiphilic molecule |
| BASF SE (purchased from Sigma Aldrich GmbH) | Pluronic ® F-108 | Amphiphilic molecule |
| Purchased from Sigma Aldrich GmbH | Hexadecanol | Amphiphilic molecule |
| Purchased from Sigma Aldrich GmbH | Tetradecanol | Amphiphilic molecule |
| Croda (purchased from Sigma Aldrich GmbH) | Span 65 | Amphiphilic molecule |
| DOW Chemicals (Purchased from Sigma Aldrich GmbH) | Triton X100 | Amphiphilic molecule |
| ASK Chemicals | Askofen 779 W 50 | Carbon source |
| ASK Chemicals | Askofen 295 E 60 | Carbon source |
| Sumitomo Corporation | Penacolite R2170 | Carbon source |
| Sumitomo Corporation | Penacolne B16 S | Carbon source |
| Allnex GmbH | Alnovol PN 320 Past | Carbon source |
| Hexamethylenetetramine (Purchase from Sigma Aldrich GmbH) | | Crosslinker/hardener |

TABLE 1

| Amphiphilic molecule | HLB value* | Molecular weight | % EO | Askofen 779 W 50 [g]: amphi-phile [g] | Rating fig transport in a Li cell | Lead acid battery example | Mean pore size [nm] | Modal pore size [nm] | pore volume [cm3/g] | BET total [m2/g] | BET micro [m2/g] | BET external [m2/g] | skeletal density [g/cm3] |
|---|---|---|---|---|---|---|---|---|---|---|---|---|---|
| Genapol PF10 | 2 | 1900 | 10 | 10:3 | − | | 139 | 1766 | 1.1 | 573 | 460 | 113 | 1.94 |
| Genapol PF10 | 2 | 1900 | 10 | 10:6 | − | | 204 | 2400 | 1.3 | 680 | 629 | 61 | 1.93 |
| Genapol PF20 | 4 | 2500 | 20 | 10:3 | + + | Mat. 1 | 81 | 121 | 0.94 | 495 | 427 | 70 | 2.0 |
| Genapol PF20 | 4 | 2500 | 20 | 10:6 | + + | Mat. 2 | 99 | 134 | 1.6 | 630 | 494 | 136 | 2.00 |
| Genapol X-080 | 13 | 550 | 64 | 10:6 | + | | 31 | 37 | 1 | 683 | 476 | 206 | 2.00 |
| Genapol X-100 | 13-14 | 640 | 69 | 10:3 | + | | 14 | 16 | 0.45 | 642 | 466 | 175 | 2.02 |
| Genapol X-100 | 13-14 | 640 | 69 | 10:6 | + | Mat. 3 | 26 | 27 | 1 | 733 | 501 | 232 | 2.01 |
| Synperonic PE/F127 | 22 | 12600 | 70 | 10:3 | + | | 15 | 15 | 0.5 | 722 | 523 | 199 | 2.02 |
| Synperonic PE/F127 | 22 | 12600 | 70 | 10:6 | + | | 15 | 15 | 0.7 | 671 | 399 | 273 | 1.93 |
| Synperonic PE/P84 | 18.5 | 4200 | 40 | 10:3 | + + | Mat. 4 | 80 | 200 | 0.7 | 659 | 553 | 106 | 2.02 |
| Synperonic PE/P84 | 18.5 | 4200 | 40 | 10:6 | + | | 25 | 26 | 1.2 | 719 | 471 | 248 | 2.03 |
| Synperonic L62 | 7 | 2500 | 20 | 10:4.5 | + + | | 100 | 318 | 1.4 | 710 | 632 | 78 | 1.99 |
| Synperonic L62 | 7 | 2500 | 20 | 10:6 | + + | | 171 | 315 | 1.8 | 657 | 568 | 89 | 1.95 |
| Synperonic P105 | 1.5 | 6500 | 50 | 10:4.5 | + | | 30 | 34 | 0.9 | 758 | 533 | 226 | 1.98 |
| Synperonic P105 | 1.5 | 6500 | 50 | 10:6 | + | | 22 | 23 | 1 | 645 | 406 | 240 | 1.96 |
| Pluronic P123 | 7-9 | 3800 | 30 | 10:3 | + + | | 67 | 187 | 0.9 | 619 | 540 | 79 | 2.02 |
| Pluronic P123 | 7-9 | 5800 | 30 | 10:6 | + + | Mat. 5 | 42 | 55 | 1.2 | 487 | 321 | 165 | 2.05 |
| Pluronic L-35 | 18-23 | 1900 | 50 | 10:4.5 | + | | 23 | 27 | 0.8 | 693 | 478 | 216 | 1.98 |
| Pluronic L-35 | 18-23 | 1900 | 50 | 10:6 | + | | 23 | 25 | 1 | 709 | 448 | 261 | 1.98 |
| Pluronic L-31 | 1-7 | 1100 | 10 | 10:4.5 | − | | 1442 | 2524 | 0.7 | 646 | 606 | 40 | 1.94 |
| Pluronic L-31 | 1-7 | 1100 | 10 | 10:6 | − | | 1000 | 3652 | 1 | 582 | 497 | 85 | 1.92 |
| Pluronic 10R5 | 12-18 | 2000 | 50 | 10:4.5 | + + | | 49 | 92 | 1.1 | 636 | 525 | 111 | 1.99 |
| Pluronic 10R5 | 12-18 | 2000 | 50 | 10:6 | + + | | 107 | 146 | 1.4 | 679 | 357 | 123 | 1.95 |
| Pluronic 31R1 | 2-7 | 3300 | 10 | 10:4.5 | − | | 113 | 3325 | 0.7 | 656 | 609 | 47 | 1.98 |
| Pluronic 31R1 | 2-7 | 3300 | 10 | 10:6 | − | | 194 | 3249 | 0.9 | 650 | 572 | 78 | 1.89 |
| Pluronic L-121 | 0.5 | 4400 | 30 | 10:4.5 | − | | 239 | 2361 | 0.3 | 691 | 620 | 71 | 1.95 |
| Pluronic L-121 | 0.5 | 4400 | 30 | 10:6 | − | | 1972 | 2361 | 1 | 630 | 585 | 45 | 1.91 |
| Pluronic F-108 | >24 | 14600 | 82.5 | 10:4.3 | + | | 13 | 15 | 0.7 | 727 | 455 | 272 | 2.01 |
| Pluronic F-108 | >24 | 14600 | 82.5 | 10:6 | + | | 16 | 20 | 0.9 | 672 | 420 | 252 | 1.99 |
| Triton X100 | 13.5 | 625 | 66 | 10:6 | + + | | 36 | 45 | 0.9 | 734 | 538 | 196 | 2.07 |
| Triton X100 | 13.5 | 625 | 66 | 10:9 | + + | | 38 | 55 | 1.2 | 704 | 515 | 189 | 2.05 |
| Hexadecanol | 15.5 | 242 | 0 | 5:5 | − | | 26 | 18 | <0.1 | 272 | 194 | 78 | 1.96 |
| Span 65 | 2.1 | 964 | 0 | 10:3 | − | | n/a | n/a | n/a | 76 | 91 | −15 | n/a |
| Span 65 | 2.1 | 964 | 0 | 10:6 | − | | n/a | n/a | n/a | 15 | 0 | 15 | n/a |
| Tetradecanol | 1 | 214 | 0 | 5:5 | − | | 22 | 16 | <0.1 | 395 | 282 | 113 | 1.88 |

− − = very poor;
− = poor;
+ = good;
+ + = very good;
*values given by providers of the amphiphilic molecule

TABLE 2

| Resin type | Amphiphilic species | Crosslinker | Recipe (wt. ratio) Resin:amphiphilic species:croslinker | Carbon yield (%) | Mean pore size (nm) | Modal pore size (nm) | Pore volume (cm3/g) | Comments |
|---|---|---|---|---|---|---|---|---|
| Alnovol PN 320 Past | Genapol PF20 | None | 10:6:0 | 29% | 78 | 89 | 0.6 | Homogeneous material |
| Alnovol PN 320 Past | Genapol PF20 | HMTA | 10:6:2 | 32% | 47 | 90 | 0.4 | Many inhomogeneities in SEM images |
| Alnovol PN 320 Past | Genapol PF20 | HMTA | 10:6:1 | 31% | Non porous | Non porous | 0.1 | Process did not produce a porous material. Material collapsed during Hg porosimetiy measurement. |

TABLE 2-continued

| Resin type | Amphiphilic species | Crosslinker | Recipe (wt. ratio) Resin:amphiphilic species:croslinker | Carbon yield (%) | Mean pore size (nm) | Modal pore size (nm) | Pore volume (cm3/g) | Comments |
|---|---|---|---|---|---|---|---|---|
| Alnovol PN 320 Past | Pluronic P123 | None | 10:12:0 | 24% | 165 | 200 | 0.8 | No porosity in the 50 to 300 nm range Homogeneous material |

TABLE 3

| Resin type 1 | Resin type 2 | Amphiphilic species | Crosslinker | Recipe (wt. ratio) Resin 1:resin 2: amphiphilic species:crosslinker | Mean pore size (nm) | Modal pore size (nm) | Pore volume (cm3/g) | Comments |
|---|---|---|---|---|---|---|---|---|
| Penacolite R2170 | None | Genapol PF20 | None | 6.67:0:3:0 | 53 | 104 | 0.8 | |
| Penacolite R2170 | None | Genapol PF20 | HMTA | 6.67:0:0.5 | 28 | 38 | 0.6 | |
| Penacolite R2170 | Askofen 779W 50 | Genapol PF20 | None | 5:5:3:0 | 49 | 44 | 0.9 | |
| Penacolite R2170 | Askofen 295 E 60 | Genapol PF20 | None | 5:5:3:0 | 11 | 12 | 0.2 | Non porous m SEM images |

TABLE 4

| Resin type | Amphiphilic species | Recipe (wt. ratio) Resin: :amphiphilic species | Comments |
|---|---|---|---|
| Askofen 295 E 60 | Pluronic P123 | 10:3 | Non porous material. Material collapsed during Hg porosimetry measurement. No porosity in the 50 to 300 nm range |

Example 5

Materials were prepared according to the recipes labelled as material 1 to 5 in Table 1. The obtained porous carbon material was resized to obtain particles having a particle size $d_{50}$ as given for the examples X1 to X7 in Table 6. The charge acceptance $I_d$ and the hydrogen evolution current Inez measured at −1.5 V were determined according to the test method herein. The particle sizing was performed as follows:

For Particles with $D_{50}$ Below 10 μm

A coarse powder was obtained by crashing the material with a mortar and pestle to break the material mechanically to particles with a maximum diameter of 5 mm. Then, the coarse powder was processed to the target size using an Alpine Multi-processing system 50 ATP with a turboplex classifier (diameter 50 mm, $Al_2O_3$ material) and an Alpine Fluidised Bed Opposed Jet Mill 100 AFG from Hosokawa Alpine AG. The multi-processing system included a cyclone (GAZ 120) and a filter. The nitrogen gas used in the air jets of the mill had 6 bar of pressure and the feed rate of the material was 1 kg/hour. The sifter speed was 16,000 rpm. The material collected was in the cyclone fraction. The particle size was measured using the method described herein.

For Particles with $d_{50}$ Greater than 10 μm

A coarse powder was obtained by crushing the material with a mortar and pestle to break the material mechanically to particles with a maximum diameter of 10 mm. Then, the coarse powder was processed using a planetary ball mill such as the PM-400 mill from Retsch GmbH with 500 mL grinding jars (type "comfort") of zirconium oxide and 10 grinding halls, each ball with a 20 mm diameter made from zirconium oxide (yttrium stabilized). The milling pots were filled with 40 mL of the coarse powder. The planetary ball mill was operated in "Manual mode" using the following parameters.

| Desired d50 | Revolution speed [rpm] | Milling time [minutes] | Repetitions | Sieving steps, mesh size of sieves |
|---|---|---|---|---|
| 10-35 μm | 300 | 5 | Twice | 1.6 mm, 400 μm |
| 35-70 μm | 300 | 3 | Once | 1.6 mm, 500 μm |

-continued

| Desired d50 | Revolution speed [rpm] | Milling time [minutes] | Sieving steps, Repetitions | mesh size of sieves |
|---|---|---|---|---|
| 70-50 μm | 250 | 2 | Once | 1.6 mm, 500 μm |
| 150-300 μm | 200 | 2 | Once | 1.6 mm, 500 μm |

The bead mills were removed from the material by using the first mesh size in the sieving step. The oversize particles in the material were subsequently removed by a second sieving step with the given mesh size. Both sieving steps were done manually with the sieve placed on top of a bottom collecting pan, both with a diameter of 200 mm and a height of 50 mm. The material and balls were placed on top of the appropriate 1.6 mm sieve and slowly shaken in a rotary fashion until the material was collected in the collecting pan. The material was transferred from the collecting pan to another vessel, the sieve was changed to the given smaller mesh size and the material was again placed on the sieve and slowly shaken in a rotary fashion. The desired material was collected from the collecting pan and the particle size was measured using the method described herein.

Lead Acid Battery Testing

Pastes for the negative electrode were prepared following the method described in the article by J. Settelein et al. (Journal of Energy Storage 15 (2018) 196-204) with the recipe given in Table 5. 2 V laboratory test cells were prepared following the procedure in the same reference.

TABLE 5

| Material. | Manufacturer | CAS-Number | Weight percent in mixture [wt. %] based on 100 g of lead dust |
|---|---|---|---|
| Lead dust (40% Pb/60% PbO) | | Pb: 7439-92-1 PbO: 1317-36-8 | |
| Distilled Water | | 7732-18-5 | 12 |
| Diluted sulfuric acid density of 1.43 | | $H_2SO_4$: 7664-93-9 $H_2O$: 773.2-18-5 | 8 |
| Barium Sulfate | Merck | 7727-43-7 | 0.8 |
| Vanisperse A | Borregaard LignoTech | | 0.2 |
| Polymer fibers (polypropylene) | | 9003-07-0 | 0.05 |
| Carbon additive | See Table 6 | | 1.0 |

After construction of the batteries, the formation cycle was conducted also following the procedure as described in the same reference. The current at −1.5V versus $Ag/Ag_2SO_4$ gives an indication for the hydrogen evolution reaction and hence an indication for the water loss in the final battery. The measurements of the hydrogen evolution reaction were conducted as described in the article by J. Settelein et al. (Journal of Energy Storage 15 (2018) 196-204).

The DCA test protocol was adapted from EN-Norm 50342-6:2015 according to the qDCA protocol and following the method described in the same reference. Voltages in EN-Norm 50342-6 were scaled by a factor of ⅙ as is appropriate for a 2 V cell, and currents were downscaled to a 1 Ah test cell regime. The values shown in Table 6 are the charging current $I_d$ after discharge as described in the reference.

TABLE 6

| Example | Material from Table 1 | Particle size $d_{50}$ [μm] | Dynamic Charge acceptance, Charge current after discharge, $I_d$ [A/Ah] | Hydrogen evolution reaction current at −1.5 V versus $Ag/Ag_2SO_4$, $I_{HER}$ [mA/Ah] | Ratio of HER current at −1.5 V versus $Ag/Ag_2SO_4$ for Matetial/Control | Performance |
|---|---|---|---|---|---|---|
| X1 | Mat, 1A | 27 | 0.93 | −58 | 1.3 | + |
| X2 | Mat. 1B | 122 | 1.08 | −81 | 1.8 | + + |
| X3 | Mat. 2 | 6 | 1.18 | −422 | 9.4 | − |
| X4 | Mat. 3 | 5 | 1.37 | −341 | 7.6 | − − |
| X5 | Mat. 4 | 304 | 0.96 | −68 | 1.5 | 0 |
| X6 | Mat. 5A | 25 | 1.36 | −197 | 4.4 | + + |
| X7 | Mat. 5B | 44 | 1.3 | −119 | 2.6 | + + + |
| Control | LB 101 | 0.095 | 0.7 | −45 | | − − |

+ + + = excellent,
+ + = very good,
+ = good,
0 = fair,
− = poor,
− − = poorer

Although illustrated and described above with reference to certain specific embodiments and examples, the present disclosure is nevertheless not intended to he limited to the details Shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

The invention claimed is:

1. A process for preparing a porous carbon material comprising the process steps:
   a. providing a carbon source comprising a first carbon source compound;
   b. providing an amphiphilic species comprising a first amphiphilic compound, the first amphiphilic compound comprising two or more adjacent ethylene oxide based repeating units;
   c. contacting the carbon source and the amphiphilic species to obtain a precursor; and
   d. heating the precursor to obtain the porous carbon material wherein the precursor does not comprise more than 1 part by weight, based on 100 parts of carbon source, of a cross-linking agent.

2. The process according to claim 1, wherein the first amphiphilic compound comprises more than 10 wt. % of ethylene oxide based repeating units, based on the total weight of the first amphiphilic compound.

3. The process according to claim 1, wherein the first amphiphilic compound comprises more than 200 Daltons of ethylene oxide based repeating units.

4. The process according to claim 1, wherein the first amphiphilic compound comprises a further repeating unit.

5. The process according to claim 4, wherein the further repeating unit is based on one selected from the group consisting of: propylene oxide, butylene oxide, ethylene, propylene and butylene.

6. The process according to claim 1, wherein the first carbon source compound comprises a ring.

7. The process according to claim 6, wherein the first carbon source compound comprises an aromatic ring with one or more hydroxyl groups connected thereto.

8. The process according to claim 1, wherein the first carbon source compound is a novolac resin.

9. The process according to claim 1, wherein the ratio of the amount by weight of carbon source to the amount by weight of the amphiphilic species is in the range from 1:10 to 10:1.

10. The process according to claim 1, wherein heating step d. is started within 1 hour of the contacting step c.

11. The process according to claim 1, wherein the heating step d. is performed at a temperature in the range from 700 to 3,000° C.

12. The process according to claim 1, wherein the first amphiphilic compound has a molecular weight of more than 300 Daltons.

13. The process according to claim 12, wherein the first amphiphilic compound comprises more than 200 Daltons of ethylene oxide based repeating units.

* * * * *